(12) United States Patent
Smith et al.

(10) Patent No.: US 11,878,246 B1
(45) Date of Patent: Jan. 23, 2024

(54) LIVE REVERB METRICS SYSTEM

(71) Applicant: Electronic Arts Inc., Redwood City, CA (US)

(72) Inventors: Matthew David Smith, Montreal (CA); Hugo David Elmoznino, Montreal (CA); Giselle Olivia Martel, Montreal (CA)

(73) Assignee: Electronic Arts Inc., Redwood City, CA (US)

( * ) Notice: Subject to any disclaimer, the term of this patent is extended or adjusted under 35 U.S.C. 154(b) by 276 days.

(21) Appl. No.: 17/486,629

(22) Filed: Sep. 27, 2021

(51) Int. Cl.
*A63F 13/54* (2014.01)
*H04S 7/00* (2006.01)

(52) U.S. Cl.
CPC .............. *A63F 13/54* (2014.09); *H04S 7/303* (2013.01); *A63F 2300/6081* (2013.01); *H04S 2400/11* (2013.01)

(58) Field of Classification Search
CPC ............. A63F 13/54; H04S 7/00; H04S 7/303
See application file for complete search history.

(56) References Cited

U.S. PATENT DOCUMENTS

| | | | |
|---|---|---|---|
| 2019/0387352 A1* | 12/2019 | Jot .......................... | H04R 3/04 |
| 2021/0213973 A1* | 7/2021 | Carillo Peña ...... | B60W 60/0011 |
| 2022/0272463 A1* | 8/2022 | Kuo ....................... | G10K 15/02 |

* cited by examiner

*Primary Examiner* — James S. McClellan
(74) *Attorney, Agent, or Firm* — McDermott Will & Emery LLP

(57) ABSTRACT

Various aspects of the subject technology relate to systems, methods, and machine-readable media for rendering audio via a game engine for a game. Various aspects may include determining sound source reverb metrics and listener reverb metrics. Aspects may include determining reverbs within a reverb possibility space for all rooms or spaces of the game rendered by the game engine. Aspects may also include determining sound tuning parameters describing reverb attenuation over distance. Aspects may include calculating acoustic parameters based on the reverb metrics, relative positions, and sound tuning parameters. Aspects may include rendering audio according to a fit of determined reverbs to the acoustic parameters.

20 Claims, 18 Drawing Sheets

US 11,878,246 B1

LIVE REVERB METRICS SYSTEM

TECHNICAL FIELD

The present disclosure generally relates to reverb metrics for audio rendering, and more particularly to audio rendering for a game platform.

BACKGROUND

Conventional video games provide audio and sound tuning for a discrete set of sound environments in a video game rendered by a game platform (e.g., game engine, game hardware, game software). Conventional audio playback architectures may generate a limited number of sound models and/or sound reverberation (e.g., audio reverb) models for the video game. When a player is in the video game having multiple spaces (e.g., corresponding to multiple sound environments) or sound environments that frequently change as the player moves around in the video game, conventional audio playback architectures may encounter inaccuracies in rendering audio and/or reverb for the particular position of the player or sound sources in the video game. Additionally, conventional audio playback architectures used to render sound may not account for varying hardware or software performance capabilities of different game platforms or consoles used to play the video game.

SUMMARY

Various aspects of the subject technology relate to systems, methods, and machine-readable media for rendering audio via a game engine. By rendering sound for each sound source and listener in a sound environment, the rendered audio may be improved. Furthermore, having audio and audio reverberation that more accurately simulates a real life auditory environment may enable an improved gaming experience, as a player is able to enjoy audio feedback that better simulates real life audio feedback or is modulated in a complimentary way to gameplay such as a modulation determined by a game/sound designer. According to the present disclosure, audio reverb metrics may be determined via raycasts for each sound source and each listener in the sound environment. The reverb metrics may be used by a flexible playback reverb architecture of the game engine to define a possibility space of reverbs. The flexible playback reverb architecture can select discrete reverbs from the possibility space of reverbs based on acoustic parameters (e.g., in order to obtain a best fit of reverbs to parameters).

According to one embodiment of the present disclosure, a computer-implemented method for rendering audio via a game engine is provided. The method includes generating, for each sound source and each listener in a sound environment, a plurality of raycasts indicative of an audio characteristic of the sound environment. The method also includes determining, based on the plurality of raycasts, a plurality of sound source reverb metrics for each sound source and a plurality of listener reverb metrics for each listener. The method also includes determining, for a sound in the sound environment, a combination of corresponding sound source reverb metrics positioned at the sound source location and corresponding listener reverb metrics positioned at a location of the listener. The method also includes determining, based on sound tuning parameters and the combination of the corresponding sound source reverb metrics and the corresponding listener reverb metrics, a plurality of acoustic parameters for the sound. The method also includes selecting, based on a fit to the plurality of acoustic parameters, a reverb from a possibility space associated with the combination of the corresponding sound source reverb metrics and the corresponding listener reverb metrics. The method includes outputting the sound via the reverb. For example, the method may include selecting a blend of reverbs and outputting the sound via the blend of reverbs.

According to one embodiment of the present disclosure, a system is provided including a processor and a memory comprising instructions stored thereon, which when executed by the processor, cause the processor to perform a method for rendering audio via a game engine. The method includes generating, for each sound source and each listener in a sound environment, a plurality of raycasts indicative of an audio characteristic of the sound environment. The method also includes determining, based on the plurality of raycasts, a plurality of sound source reverb metrics for each sound source and a plurality of listener reverb metrics for each listener. The method also includes determining, for a sound in the sound environment, a combination of corresponding sound source reverb metrics positioned at the sound source location and corresponding listener reverb metrics positioned at a location of the listener. The method also includes determining, based on sound tuning parameters and the combination of the corresponding sound source reverb metrics and the corresponding listener reverb metrics, a plurality of acoustic parameters for the sound. The method also includes selecting, based on a fit to the plurality of acoustic parameters, a reverb from a possibility space associated with the combination of the corresponding sound source reverb metrics and the corresponding listener reverb metrics. The method includes outputting the sound via the reverb. For example, the method may include selecting a blend of reverbs and outputting the sound via the blend of reverbs.

According to one embodiment of the present disclosure, a non-transitory computer readable storage medium is provided including instructions (e.g., stored sequences of instructions) that, when executed by a processor, cause the processor to perform a method for rendering audio via a game engine. The method includes generating, for each sound source and each listener in a sound environment, a plurality of raycasts indicative of an audio characteristic of the sound environment. The method also includes determining, based on the plurality of raycasts, a plurality of sound source reverb metrics for each sound source and a plurality of listener reverb metrics for each listener. The method also includes determining, for a sound in the sound environment, a combination of corresponding sound source reverb metrics positioned at the sound source location and corresponding listener reverb metrics positioned at a location of the listener. The method also includes determining, based on sound tuning parameters and the combination of the corresponding sound source reverb metrics and the corresponding listener reverb metrics, a plurality of acoustic parameters for the sound. The method also includes selecting, based on a fit to the plurality of acoustic parameters, a reverb from a possibility space associated with the combination of the corresponding sound source reverb metrics and the corresponding listener reverb metrics. The method includes outputting the sound via the reverb. For example, the method may include selecting a blend of reverbs and outputting the sound via the blend of reverbs.

According to one embodiment of the present disclosure, a system is provided that includes means for storing instructions, and means for executing the stored instructions that, when executed by the means, cause the means to perform a method. The method includes sending a query to determine a sound environment and sound sources within the determined sound environment. The method also includes receiving an indication of the sound sources within the sound environment. The method also includes generating, for each sound source and each listener in a sound environment, a plurality of raycasts indicative of an audio characteristic of the sound environment at their respective positions. The method also includes determining, based on the plurality of raycasts, a plurality of sound source reverb metrics for each sound source and a plurality of listener reverb metrics for each listener. The method also includes determining, for a sound in the sound environment, a combination of corresponding sound source reverb metrics positioned at the sound source location and corresponding listener reverb metrics positioned at a location of the listener. The method also includes determining, based on sound tuning parameters and the combination of the corresponding sound source reverb metrics and the corresponding listener reverb metrics, a plurality of acoustic parameters for the sound. The method also includes selecting, based on a fit to the plurality of acoustic parameters, a reverb from a possibility space associated with the combination of the corresponding sound source reverb metrics and the corresponding listener reverb metrics. The method includes outputting the sound via the reverb. For example, the method may include selecting a blend of reverbs and outputting the sound via the blend of reverbs.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The disclosed systems, methods, and machine-readable media address a problem in traditional gaming-related audio rendering, namely inadequate quality and scalability for different sound environment configurations. This is a problem specifically arising in the realm of computer technology. The problem is addressed by providing a solution also rooted in computer technology, namely, by providing for rendering audio and/or reverbs via a flexible reverb architecture, reverb metric generation, and physically based acoustics implemented by a game computing platform. The solution may improve crossfading between various discrete reverbs for a particular sound environment.

As used herein, scalability may refer to selection of a number of discrete reverbs that may span a possibility space, such as based on performance capability of a corresponding game platform. Additionally, scalability may refer to integration of user generated content or environments within a rendered game for generating corresponding audio by the game platform (e.g., game engine). Scaling can also involve scaling to different game situations with less sound tuning based on more effectively calculated reverbs and acoustic parameters. The solution provides advantages in rendering audio by immersing players more fully in a game world and improving player spatial awareness, such as awareness of teammates or enemies. As used herein, the terms game platform and game engine may refer to hardware and/or software used for rendering video games.

Example System Architecture

Figure 1:
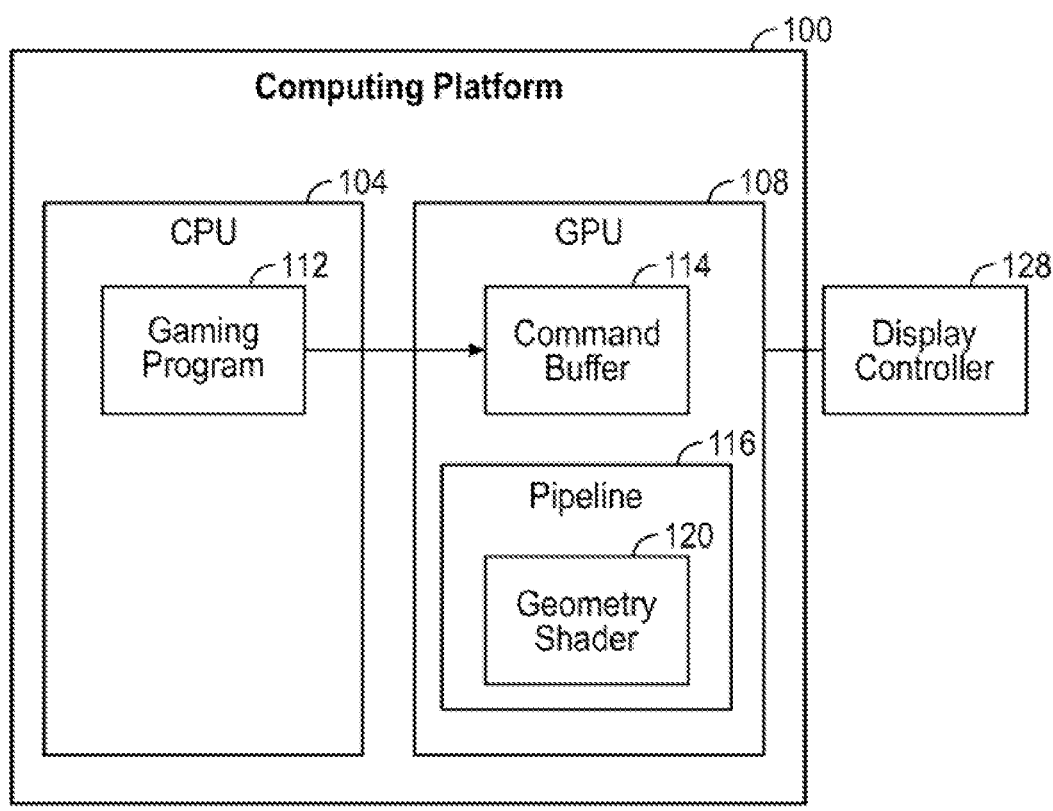
FIG. 1 illustrates an example computing platform for graphics processing suitable for practicing some implementations of the disclosure.

FIG. 1 illustrates an example computing platform 100 for graphics processing suitable for practicing some implementations of the disclosure. The computing platform 100 includes a CPU 104 which may execute computer instructions of one or more programs loaded to a memory device associated with the CPU 104. It will be appreciated that CPU 104 may include one or more processors in any computing architecture and communication methodologies there between. The processors may be co-located on the same device or one or more of them may be remotely located.

The computing platform 100 also includes a GPU 108 which may also execute computer instructions of one or more programs loaded to a memory device associated with the GPU 108. In particular, the GPU 108 may be particularly adapted to perform graphical programs and computations in a specialized and efficient manner. The GPU 108 may comply with an Application Program Interface (API) that includes one or more commands that can be called from programs executed by the GPU 108 or by other processors such as the CPU 104.

In some embodiments, the GPU 108 may include a command buffer 114 into which one or more applications, such as one or more gaming applications executed by CPU 104, enter commands.

A pipeline 116 may be configured to retrieve commands from the command buffer 114 and execute them. The pipeline 116 includes a geometry shader stage 120, along with other stages.

The GPU 108 may also include a query handler for receiving one or more queries from programs executed by the GPU 108 or by other processors such as the CPU 104, and providing responses. In some embodiments, the query handler may be accessed through the API as well. In some embodiments, the query may be issued as a command stored in the command buffer and may be executed by the pipeline 116 as any other command. The queries may relate to the states or actions of the GPU 108, for example, querying how many primitives the geometry shader function 120 has output.

When the pipeline 116 is done, it may send one or more rendering commands to a display controller 128. The display controller 128 may be executed on the same computing platform 100 or a remote one, as is the case with cloud gaming in which all logic and computations are performed at a remote location and the frames are transmitted to the user's platform, such as set top box for display.

The CPU 104 may execute one or more programs, such as a gaming program 112 comprising logic, graphic and additional commands. Some commands, for example, commands related to the logic of the game are performed by the CPU 104. However, other commands and in particular graphic-related commands may be performed by placing commands, including drawing commands, queries, or the like in the command buffer 114, wherein the commands comply with the interface of the GPU 108.

Figure 2:
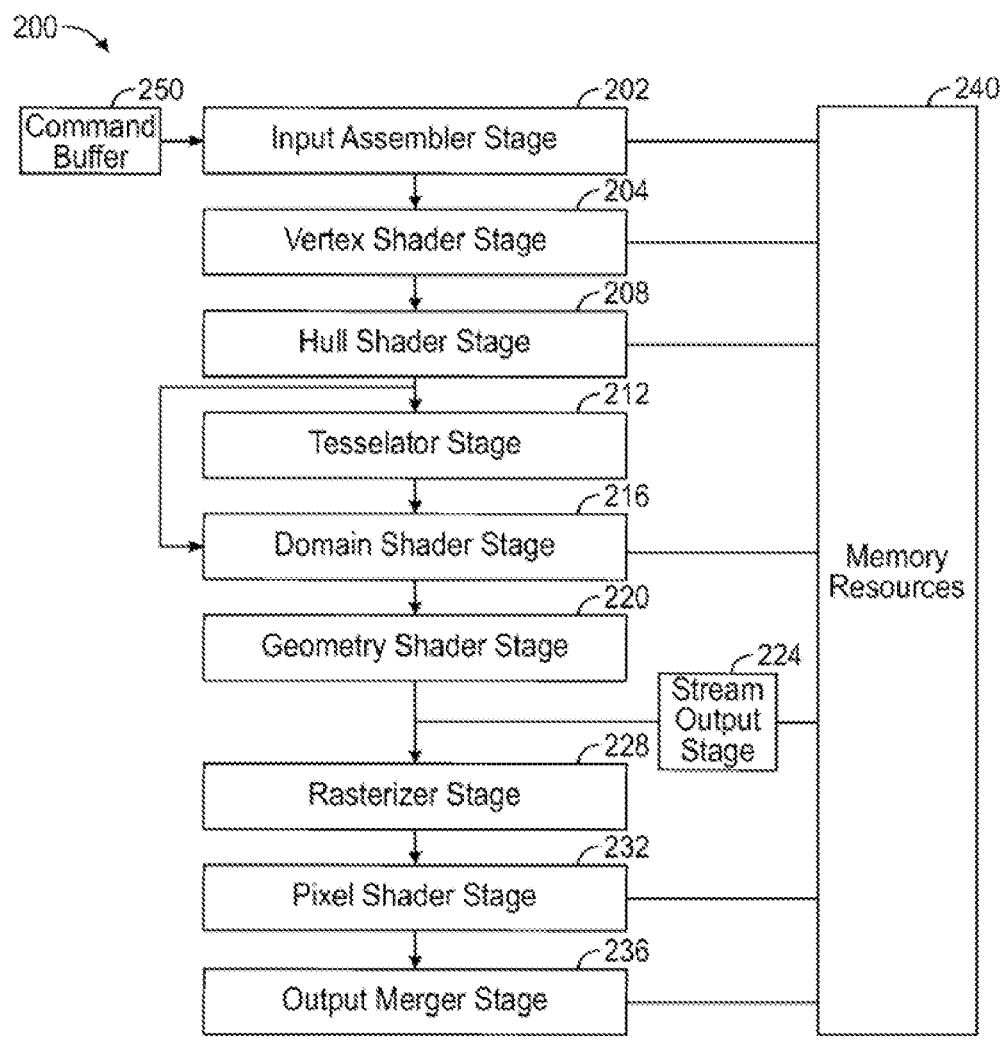
FIG. 2 is a block diagram illustrating an example rendering pipeline, according to certain aspects of the disclosure.

FIG. 2 is a block diagram illustrating an example rendering pipeline 200, according to certain aspects of the disclosure. For example, the rendering pipeline 200 can include a vertex shader (VS) stage 204, a hull shader stage 208, a domain shader stage 216, a geometry shader (GS) stage 220, and a pixel shader stage 232. The rendering pipeline 200 can further include other stages, including an input assembler stage 202, a tesselator stage 212, a rasterizer stage 228, and an output merger stage 236.

In an example operation, a GPU may append or remove vertices from the pipeline 200 in the GS stage 220 after going through the VS stage 204. The GS stage 220 may be used for performing different tasks, such as accelerating algorithms for 3D mesh rendering. The GS stage 220 may receive primitives, such as one triangle or squares, with or without adjacency data, as input rather than single vertices as in the VS stage 204.

All stages except the tesselator stage 212 and the rasterizer stage 228 may read from or write to memory resources 240. The GS stage 220 may also output data utilizing a stream output (SO) stage 224. The SO stage 224 allows the vertices to be returned to the system's RAM, for example, for inspection after going through the GS stage 220.

According to an aspect, a command buffer 250 may provide inputs into the rendering pipeline 200. For example, the command buffer 250 provides inputs into the input assembler stage 202. According to further aspects, the hull shader stage 208 can skip over the tesselator state 212 and go directly to the domain shader stage 216.

It will be appreciated that different pipelines implemented in other systems or other versions may also be utilized.

Example System for Audio Rendering

Figure 3A:
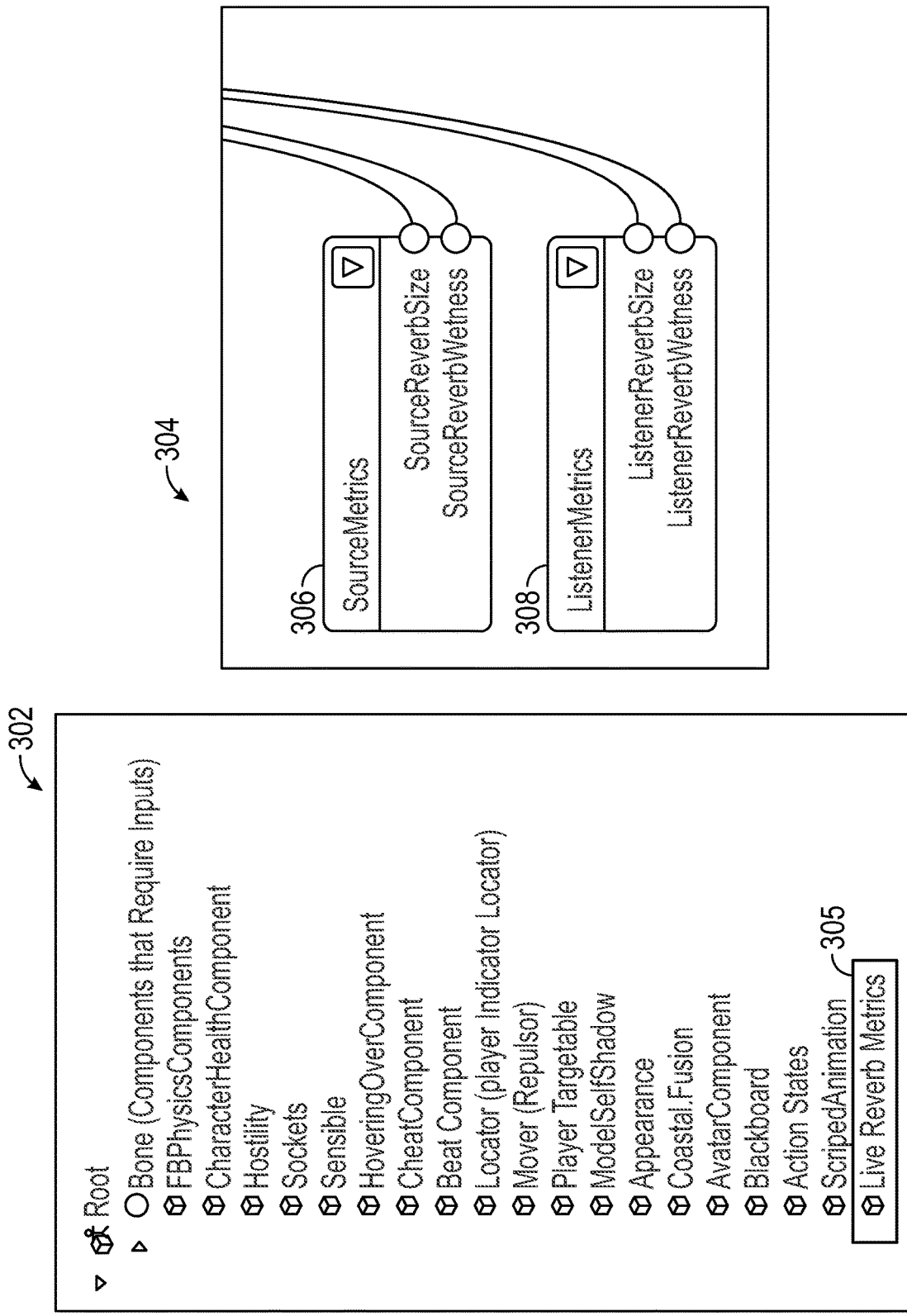
FIG. 3A illustrates an entity-component hierarchy of an example game entity having rendering metrics and reverb metrics, according to certain aspects of the disclosure.

FIG. 3A illustrates an entity-component hierarchy 302 of an example game entity having rendering metrics and reverb metrics, according to certain aspects of the disclosure. A entity-component hierarchy 302 includes a first element which can also be referred to as a root node. The root node is a structural element that may be used to organize a game entity at a given position in an environment or scene rendered by a game platform or engine. In the entity-component hierarchy 302, the root node may be considered a parent element that includes child elements that are nodes such as bone, FB physics component, character health component, hostility, sockets, sensible, hovering over component, cheat component, beat component, locator, mover, player targetable, model self-shadow, appearance, coastal fusion, avatar component, blackboard, action states, scripted animation, live reverb metrics 305, and/or the like.

As an example, the bone child node may refer to components of the game platform that require additional inputs. For example, the bone child node may require input attributes such as clothing type or design appearance for a particular character in the game. As an example, the FB physics component may be selected to define the simulated physics of the game, the character health component may be selected to track health of players in the game (e.g., after battles), the locator node may be selected to indicate player location, the mover node may be selected to add an energy beam option to repulse other objects or players, the live reverb metrics node 305 may be selected to allow the game entity to query its environment through the use of raycasts, and to provide source reverb metrics to sounds player at or near the location of the game entity. The sound sources may be determined in response to a sent query to determine the sound sources within the sound environment rendered by the game platform.

The selectable nodes in the entity-component hierarchy are predefined game objects that facilitate design of the game such as by automating portions of the programming required for the game. Combining various nodes can be used to create more complex game mechanics. The child nodes can inherit the properties of their parent as well as have their own properties. The child nodes can have specific properties related to their type, such as density, restitution, collision group, linear damping, and angular damping for the FB physics component, for example.

A graphical user interface (GUI) may be provided for a user (e.g., game designer) of the game platform to design the game. The user may use the GUI to manipulate the entity-component hierarchy 302 by selecting a subset or all of the available nodes in the entity-component hierarchy 302. If a node requiring inputs is selected, the user can indicate user specified require inputs via the GUI. The user can use the GUI to save a selected combination of nodes for use in designing the game or for future use. In general, the entity-component hierarchy 302 is usable by the user to define how structural elements (e.g., nodes) are mixed to define a game environment provided by the game platform.

The live reverb metrics node 305 included in the entity-component hierarchy 302 can advantageously be used to simplify the modeling of and increase the accuracy of simulated sound (e.g., reverb) in a sound environment of the game. The live reverb metrics node 305 may be used to automate the application of sound reverberation metrics in rendering the game by the game platform. Live sound reverb metrics may be calculated for each identified sound source and listener within one or more sound environments rendered by a game platform or engine. That is, the sound reverberation metrics can be calculated and used in order to build a model around each individual sound source in a given sound environment. Moreover, the sound reverberation metrics can be calculated and used in order to build a model around each listener in the given sound environment, such as each of multiple players that are playable in the game (e.g., a multiplayer role playing game). For incorporation of reverberation metrics, an audio rendering pipeline 304 includes a source reverb metric node 306 for each sound source in the given sound environment and a listener metric node 308 for each listener in the given sound environment. For example, a sound source may be an explosion, foot step, party popper, gun shot, skateboard motion, movement, and/or the like. A listener may be a playable character, a game entity controlled by a user of the game platform and/or the like, for example. The audio rendering pipeline 304 can utilize a combination of the source reverb metric node 306 for each sound source in the given sound environment and the listener metric node 308 for each listener in the given sound environment.

The source reverb metric node 306 may comprise parameters such as the sound reverb size parameter, source reverb wetness parameter, sound reverb diffuseness parameter and/or the like. The listener metric node 308 may comprise parameters such as the listener reverb size parameter, listener reverb wetness parameter, listener reverb diffuseness parameter (e.g., number of surfaces for sound to reflect off of, reverb density) and/or the like. The reverb metric parameters may be assigned a value within a possibility space for reverbs. The source reverb size parameter and listener reverb size parameter may refer to a quantity or extent of sound that is routed through a corresponding reverb. To elaborate further, the source reverb size parameter and listener reverb size parameter define the physical size of the reverberant space corresponding to the live reverb metrics node 305 (and given sound environment), which is correlated with the audible length of a corresponding reverb. The audible length may depend on a corresponding parameter value within the possibility space. As an example, the possibility space may span between 0 and 1. Determining and populating the reverb possibility space may be performed offline (e.g., prior to rendering audio for the game via the game platform).

Similarly, the source reverb wetness parameter and listener reverb wetness parameter define a proportion of reverb wetness and dryness in the sound environment, depending on the corresponding parameter value within the possibility space that can span values ranging within 0 to 1. For example, a proportion of 30% (0.3) and 70% (0.7) ratio of wetness and dryness refers to 30% (0.3) of the sound corresponding to a more confined space (e.g., reverb corresponding to echo off the surfaces of the confined space) and 70% (0.7) of the sound corresponding to the original sound (e.g., no reverb due to being sound played in a wide open space). The source metric node 306 and listener metric node 308 may define reverb metrics in the sound environment simply as function of reverb size and wetness. Wetness may refer to a processed audio signal with delay effects as compared to a dry unprocessed audio signal. The reverb metrics may also be defined as a function of decay, pre-delay, diffusion, and/or the like.

Within a specific sound environment, the specific sound source environment reverb metrics for the source metric node 306 and the specific listener environment reverb metrics for the listener metric node 308 may be determined based on performing multiple raycasts from all significant sound source and around all listener positions, respectively. The rays of the multiple raycasts are omni-directional and independent of listener position and sound source location. In this way, the multiple raycasts can capture characteristics of the local sound environment where the source or listener (e.g., microphone) is located. For example, the captured characteristics may be audio characteristics, positional characteristics, spatial semantic characteristics (e.g., whether the source location is located under a bridge), and/or the like. For example, the raycasts can reflect/reverberate off the bounds of the local sound environment, such as the walls, floors, and ceiling of a room sound environment. The local space may be defined as 20 meters in proximity to the sound source or listeners, respectively, or may be defined as between 10 meters to 20 meters or some other appropriate distance. The local space can represent particular areas in the game, such as an alleyway, a bathroom, an open space, and/or the like. In contrast, a world environment can represent an overarching category of environment that every sound belongs to, such as downtown Manhattan, a dense forest, a canyon, and/or the like. The world environment can be defined as 100 meters to 200 meters from the sound source or listeners, respectively, or some other appropriate distance.

As an example of the multiple raycasts, a specific number of raycasts can be determined and performed, such as 24 or some other suitable number. The amount of raycasts may be determined on sound source location, such as increasing the number of raycasts if the sound source location is a covered location. Audio fidelity and processing cost increases in proportion to the number of raycasts used. The raycasts may be performed to measure distances to objects (e.g., distances to objects hit by the raycasts), material reflectivity (e.g., what material was hit, how reflective and absorbent the material is, etc.), and diffuseness of material and the entire space). The raycasts may be performed offline (e.g., not during game runtime) to improve processing efficiency, performance, and/or fidelity during runtime. The source metric node 306 and the listener metric node 308 may be used to parameterize the possibility space of the sound environment rather than broadly classifying the sound environment (e.g., as a tunnel, cathedral, etc.). For example, a selection of discrete reverbs to sparsely populate the possibility space may be determined offline based on a performance capability of the game platform being used. In this way, the reverb possibility space and sparse population can be adjusted and scaled according to different game platforms and games/audio being rendered. A sound designer can use and determine the reverb metrics specified by the source metric node 306 and the listener metric node 308 to design the acoustic quality of the sound environment.

Figure 3B:
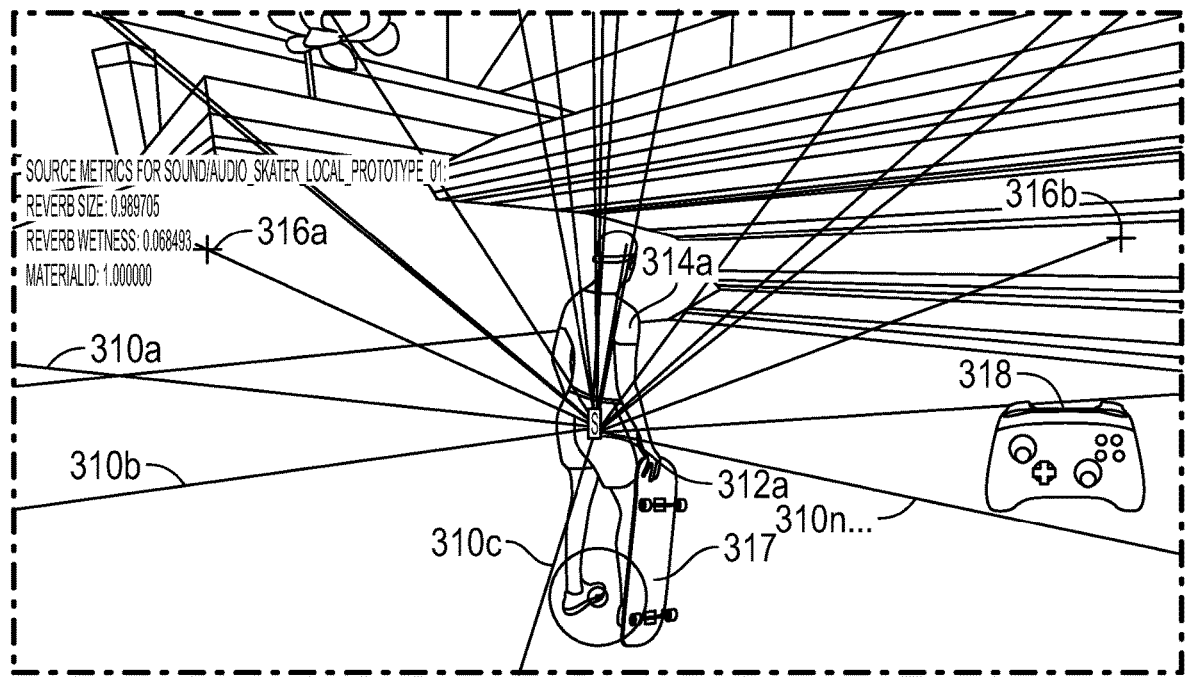
FIGS. 3B-3F illustrate example applications of raycasts corresponding to various reverb metrics, according to certain aspects of the disclosure.
Figure 3C:
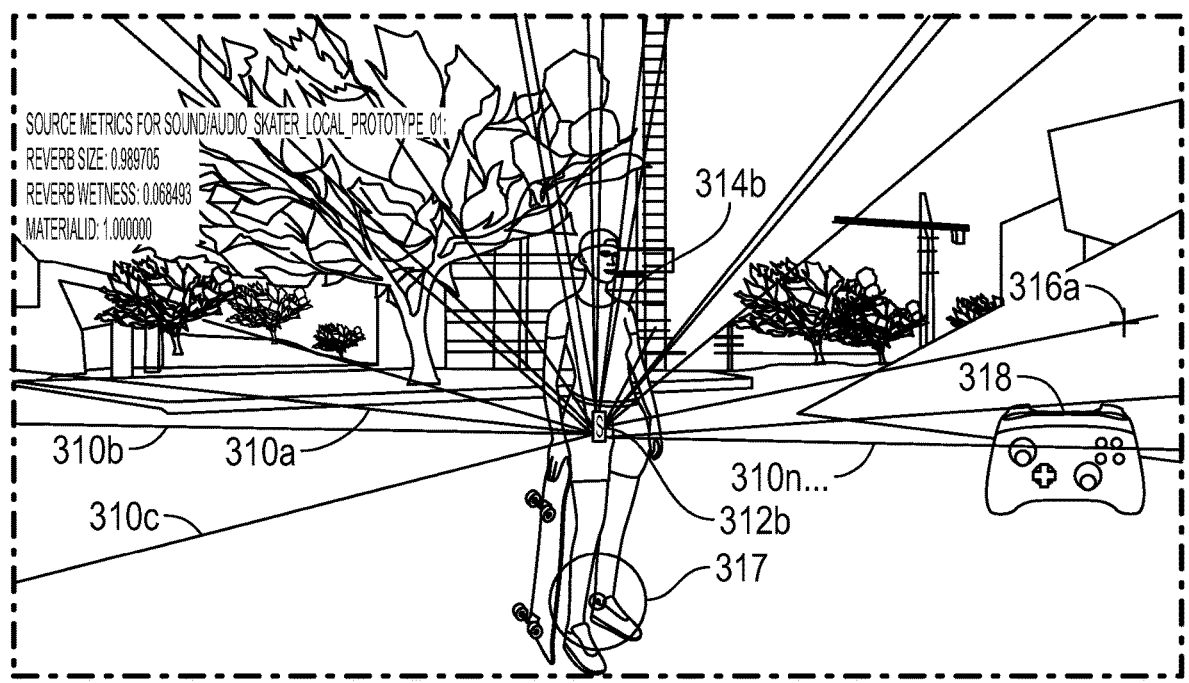
Figure 3D:
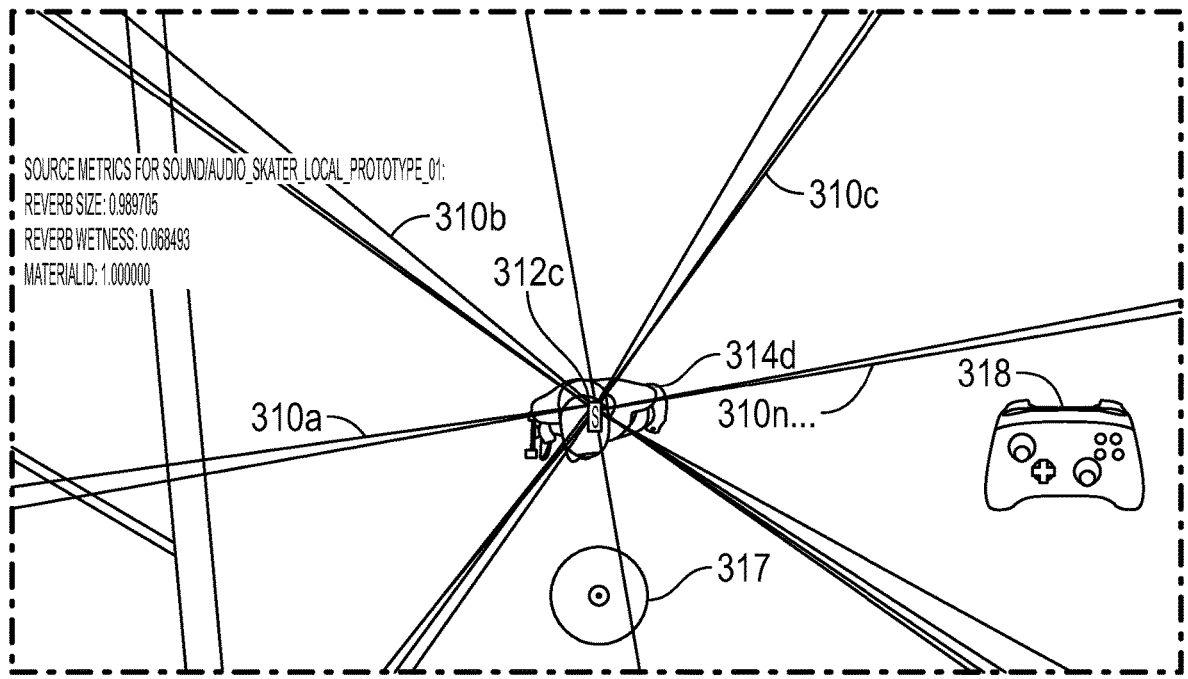
Figure 3E:
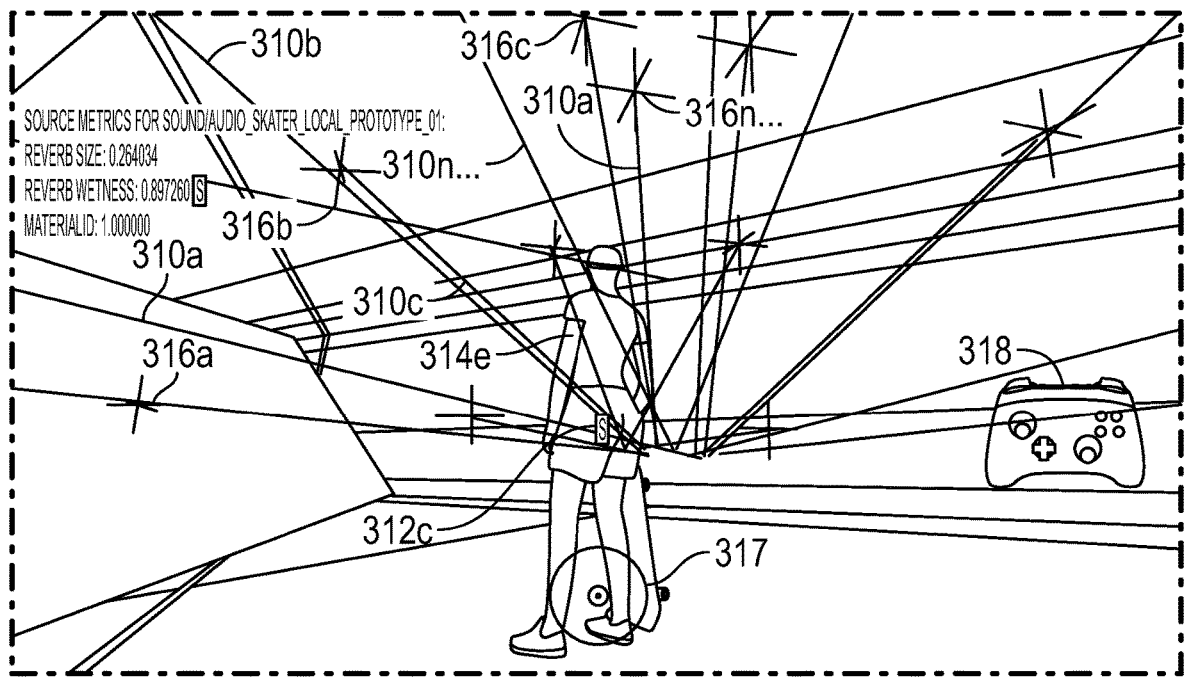
Figure 3F:
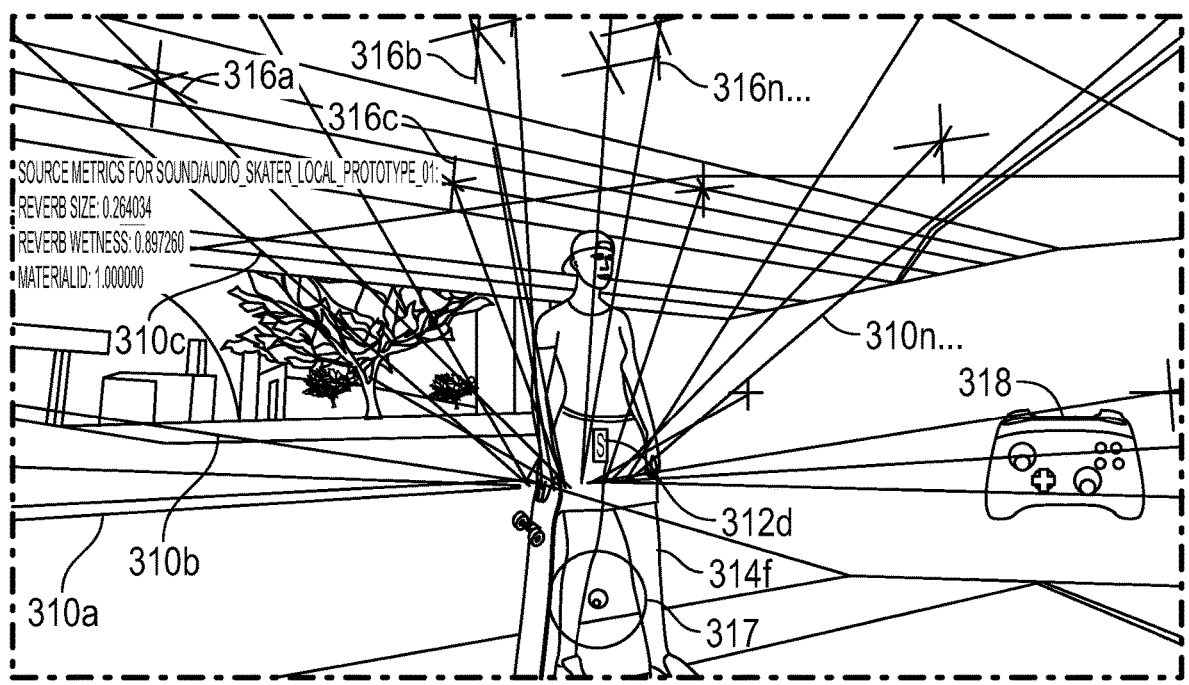

FIGS. 3B-3F illustrate example application of raycasts corresponding to various reverb metrics, according to certain aspects of the disclosure. In FIGS. 3B-3F, raycasting is performed such that various raycasts (rays) 310*a*, 310*b*, 310*c* . . . 310*n* (e.g., 310*a*-310*n*) can be perceived as lines that may extend linearly from an originating location to a destination location. The number of raycasts and relative location of the raycasts 310*a*-310*n* may vary or appear differently depending on corresponding viewpoints of FIGS. 3B-3F. For example, FIG. 3B-3C can show a point of view (POV) type of view in an open space sound environment of a game rendered via a flexible reverb playback architecture of a game platform. FIG. 3E-3F can also show a POV type of view another sound environment of the game in a more enclosed space. FIG. 3D can show an aerial view of another sound environment of the game. The raycasts 310*a*-310*n* can be omni-directional and span the distance from a sound source location to a reflective surface (e.g., simulating when a sound contacts and reflects off a surface in a given sound environment). For example, the raycasts 310*a*-310*n* may originate from or correspond to sound source origin 312*a*-312*e*, as indicated by the icon of sound source origin 312*a*-312*e* in FIGS. 3B-3F.

The sound source origin 312*a*-312*e* may partially overlap or correspond to a player 314*a*-314*e* in the corresponding sound environments. This can be because the player 314*a*-314*e* generates or emits sound, such as by virtue of their activity with a skateboard. The points at which the raycasts 310*a*-310*n* contacts or intersects with an in-world surface of the game are denoted by crosses 310*a*, 316*b*, 316*c* . . . 316*n* (e.g., 316*a*-316*n*). In this way, each sound environment within the game can have a plurality of raycasts 310*a*-310*n* intersecting with surfaces in the game as indicated by crosses 316*a*-316*n* so that sound source environment reverb metrics and listener environment reverb metrics can be determined. The types of surfaces in the game being contacted as indicated by the crosses 316*a*-316*n* can vary depending on the sound environment and/or game environment. For example, FIG. 3A can show raycast contact at a brick surface at cross 316*a* and raycast contact at a concrete surface at cross 316*b*. In general, the contacted surfaces indicated by the crosses 316*a*-316*n* can be any type of surface such as a wall, a floor, a ceiling, a sign, a layer, an outward facing portion of an object, ground, terrain, or a three dimensional model of an object.

Different types of surfaces such as soft carpet versus hard concrete or wood, etc. can result in different reverberations. As such, the resulting reverb metrics that simulate accurate or desired reverb effects off of different types of surfaces can depend on the type or identity of those corresponding surfaces. As an example of a sound causing reverberation, the player 314*a*-314*e* may emit a sound via activity with their skateboard. A user of the game may use a user input or controller corresponding to the controller icon 318. The user input or control may control motion of the player 314*a*-314*e* via the control circle 317. For example, the control circle 416 may be used to control the aerial maneuver performed by the player 314*a*-314*e*. The game may provide a tutorial icon 320 which may indicate various maneuvers that can be performed by the player 314*a*-314*e*. As an example, the tutorial icon 320 can indicate that button one and button two of the controller should be held to performed and jumping and/or diving motion by the player 314*a*-314*e*.

FIGS. 3B-3C may depict a situation in which a small subset of the raycasts 310*a*-310*n* contact a surface. Moreover, the small subset of the raycasts 310*a*-310*n* can contact corresponding surfaces at a relatively far distance. Accordingly, because there are relative few of the raycasts 310*a*-310*n* reverberating off far surfaces, the reverb wetness can be relatively low and the reverb size can be relatively high. For example, on a scale spanning 0 to 1, the reverb size can be 0.989705 while the reverb wetness may be 0.068493. FIG. 3D may more clearly indicate a structure and pattern of the raycasts 310*a*-310*n* corresponding to FIGS. 3B-3C in a bird eye view (e.g., aerial view). FIGS. 3E-3F may depict a situation in which a large subset of the raycasts 310*a*-310*n* can contact corresponding surfaces at a relatively low distance. That is, FIGS. 3E-3F may depict a more enclosed situation or sound environment within the game. Accordingly, because there are relative more of the raycasts 310*a*-310*n* reverberating off far surfaces, the reverb wetness can be relatively high and the reverb size can be relatively low. For example, on a scale spanning 0 to 1, the reverb size can be 0.264034 while the reverb wetness may be 0.897260.

The raycasts 310*a*-310*n* (e.g., intersecting with surfaces in the game as indicated by crosses 316*a*-316*n*) being used to determine sound source environment reverb metrics and listener environment reverb metrics can involve a selection process of which subset of the raycasts 310*a*-310*n* to query from a sound source position or listener position, such as from the sound source origin 312*a*-312*e*. For example, the selection may involve a query raycast selection process to obtain unbiased and more realistic results via obtaining a proportionate contribution from each raycast to the resulting reverb metrics. The selection can involve selecting a subset of directions (e.g., angles) to query at a given frame from a finite set of possible angles, such as relative to the sound source origin 312*a*-312*e*. In this selection process, each angle may contain one or more raycasts and representing elevation oriented from an origin of an XY plane in a particular sound environment. The origin of the XY plane can be located at the center of a sound source component such as the sound source origin 312*a*-312*e*.

Additionally or alternatively, the origin and the finite set of all possible angles can be user defined, such as via a game engine editor of the game platform for the game. For each angle of the finite set, a user of the game engine editor can specify the number of raycasts that can be rendered from a corresponding direction for a given query. Each angle may form a "latitude band" (e.g., raycast band) containing one or more raycasts. Latitude bands can have multiple attributes such as raycasts elevation angle attribute, number of raycasts attribute, weight attribute, and/or the like. The raycasts 310*a*-310*n* can be organized into latitude bands, which can be prioritized based on their elevation from the source/listener position, such as sound source origin 312*a*-312*e*, camera location, and/or the like. Latitude bands may be prioritized because performance constraints of the game platform may make it infeasible to always query all raycasts from all user specified directions each frame. As such, generally one latitude band is selected per query, although in some situations, more than one latitude band can be selected per query. Also, the user may have the flexibility to independently determine a selection of raycasts for user defined use cases.

For example, the user may define 5 latitude bands that are each associated with an angle, as indicated by the raycasts elevation angle attribute. The 5 latitude bands can be rendered from each source/listener position from −90, −45, 0, 45, and 90 degrees. As an example, the user may indicate number of possible raycast(s) at each defined latitude band and an associated weight, as reflected by the number of raycasts attribute and weight attribute. The weight attribute can be used for subjective biasing along certain directions.

The query raycast selection process may start with an offline step of generating a "priority" value for each of the user-specified latitude bands, such as that each possible direction or angle is selected in an unbiased manner based on each direction having a proportionate likelihood of being queried per frame. The priority value can be calculated by modelling a sphere around the source/listener where the raycasts 310a-310n are rendered from, and then determining the relative proportion of surface area of a given latitude band to the total surface area of the sphere. The width of the latitude band used in calculating its surface area is determined by its associated angle (e.g., raycasts elevation angle attribute) and relative proximity to neighboring latitude bands. Latitude bands with a larger proportion of the total sphere surface area can be assigned higher priorities.

The offline step may be followed by game runtime in which one or more of the offline configured latitude bands may be selected for query. For example, the latitude band containing the raycast(s) that will be selected for query at a given frame can be determined by a weighted random shuffle algorithm. The weighted random shuffle algorithm can refer to using a weighted randomizer created using the pre-calculated priority values. The pre-calculated priority values can be determined according to band surface area, distance, spherical surface area, and relative priority. Band surface area can be calculated by 2 multiplied by π multiplied by radius multiplied by distance (top latitude—bottom latitude). The distance can be calculated as ((top latitude—bottom latitude) multiplied by Radius) divided by 90 degrees. The spherical surface area can be calculated by 4 multiplied by it multiplied by radius squared.

The relative priority can be calculated as band surface area divided by spherical surface area which equals 0.5 multiplied by ((top latitude–bottom latitude) divided by 90). As an example, with three latitude bands at −45, 0, and 45 degrees, the calculation of surface area segment of a sphere between two planes at 0 would be bordered between dotted lines at 22.5 and −22.5 degrees and solid lines at 45 degrees and −45 degrees. The dotted lines at 22.5 and −22.5 degrees representing top latitude and bottom latitude may be above and below the 0 degree line, respectively. The solid lines at 45 degrees and −45 degrees representing top neighbor latitude and bottom neighbor latitude may be above and below the top latitude and bottom latitude lines, respectively.

To elaborate further, calculation of surface area is determined by calculating the segment of a sphere that each latitude band represents. For example, the latitude band with angle attribute 0, the surface area segment would be determined as the surface area bordered by two planes as represented by the dotted lines at 22.5 and −22.5 degrees respectively (i.e. the north plane and south plane). These plane angles can be calculated by taking the halfway point between the nearest neighboring latitude band and the current band. The associated plane angle would be calculated by subtracting the current angle from the neighbor angle, dividing this by two, and then adding the current angle, such as according to the following equation:

$$\text{plane}_i = \frac{\text{neighbor}_i - \text{current}_i}{2} + \text{current}_i.$$

Figure 11:
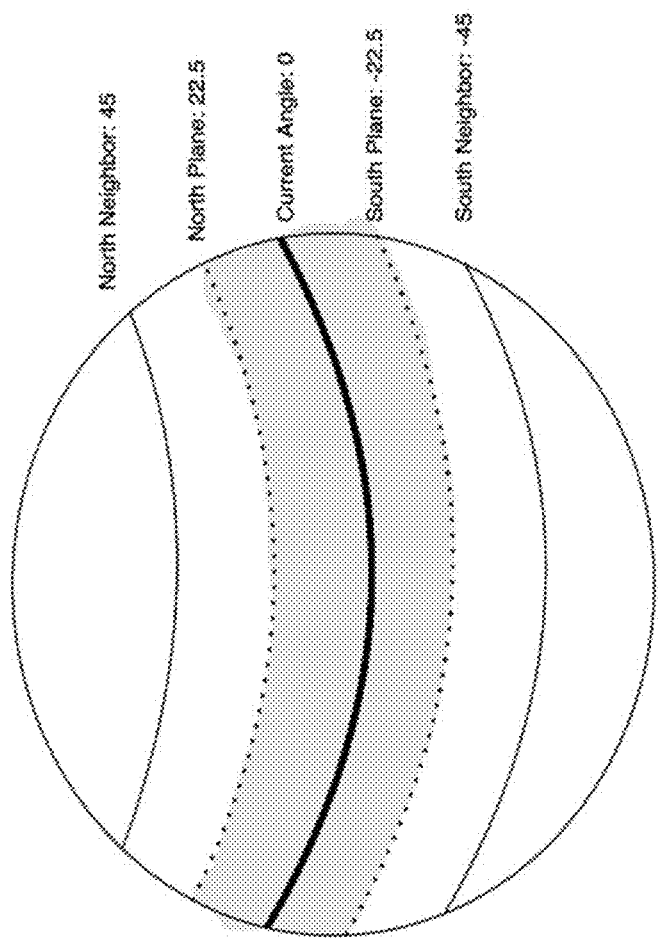
FIG. 11 is a representation of a spherical model for calculating a priority value around the source/listener.

This process can be visualized by FIG. 11.

As shown in FIG. 11, the resulting surface area of the latitude band with an attribute of 0 degrees is highlighted in grey. In this way, priority can be given to bands with larger surface area relative to the surface area of the whole sphere.

The weighted random shuffle algorithm may ensure that the selection of angles is different at each frame. Such change in selection can advantageously avoid inaccuracies associated with selecting the same angle over time. The weighted random shuffle algorithm also may ensure the selection of angles over time follows a discrete distribution relative to the determined priorities (e.g., generally non-uniform due to spherical geometry but always proportionate). The selection of raycasts can also involve sound source raycast radius, listener raycast radius, max source updates, physics collision categories, platform, and identifier such as audio subtype global unique identifier (GUID), and/or the like. As discussed above, the user may have the flexibility to independently determine a selection of raycasts for user defined use cases. The user determined selection of raycasts can involve a method for allowing the user to bias the potential result for subjective or artistic purposes, which can provide a greater level of customization of reverbs and/or reverb metrics.

As an example, a default setting can be that the contribution of each raycast associated with a component/location within the game is unbiased relative to the calculated corresponding reverb metrics but a user customized setting can cause raycast contributions to be biased with respect to resulting reverb metrics. For example, the user can assign subjective tuning parameters (weights) to each angle to be able to prioritize or assign more weight to certain directions around the source/listener component (e.g., sound source origin 312a-312e). By factoring in certain direction to different extends, the contribution of each raycast can be biased relative to the overall reverb metrics. For example, the user may desire that information from raycasts that point upward may be taken more into account, as opposed to raycasts that point horizontally. The user may select a prioritization of any possible direction or other user defined subset of the raycasts 310a-310n. As an example, for a particular sound environment such as an enclosed space in the game, querying a ceiling as opposed to querying walls may be a better indicator of a source/listener.

The contribution of each raycast can be defined by a numerical contribution factor, which can be calculated offline for all possible raycasts 310a-310n. In particular, the default unbiased setting may correspond to an equal contribution factor in which all latitude band weights are set to 1 such that the contribution of each raycast is unbiased and proportionate. For the user defined biased method, individual band weights can be set at values that are different from 1. As an example, during game runtime, once an angle is selected at a given frame, the contribution of each of the raycast(s) rendered at that angle can be taken into account using the associated pre-calculated contribution factors. For example, the associated pre-calculated contribution factors can be configured by the user such that corresponding latitude band weights are changed from the default of 1.

The contribution factor of a given raycast i within a latitude band k can be calculated according to the following equations. L may be equal to the total number of latitude bands. The contribution factor of a latitude band k can equal:

$$\frac{\text{Weight}_k}{\sum_{n=1}^{L} \text{Weight}_n}.$$

The contribution factor of a raycast i for a latitude band k can equal:

$$\frac{\text{contribution factor band}_k}{\text{number of raycasts}_k}.$$

Based on these formulas, the total of the contribution factors of the total number of raycasts associated with the component/location within the game sums to one such that $$N = \text{Total Number of Raycasts and } \sum_{n=1}^{N} \text{Contribution Factor}_n = 1.$$

Figure 4A:
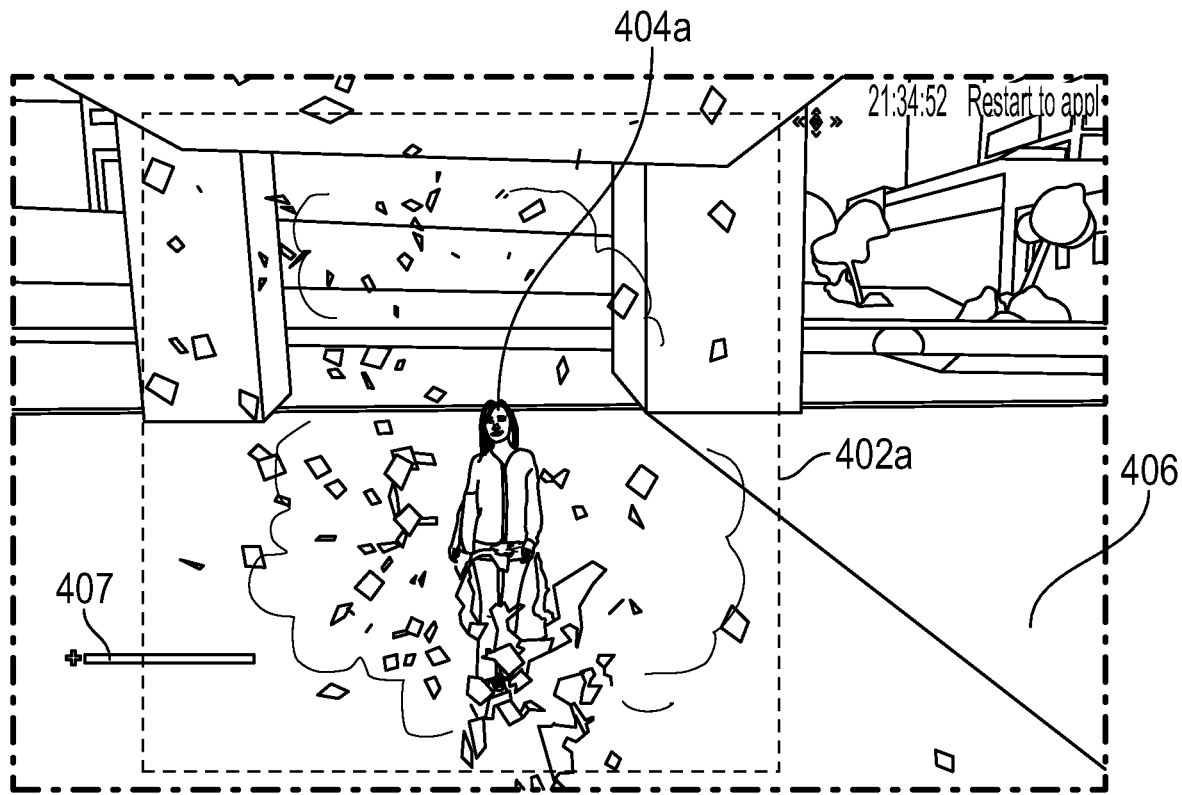
FIGS. 4A-4F illustrate example sound environments corresponding to particular environment parameters, listener reverb metric, and sound source metrics, according to certain aspects of the disclosure.

FIGS. 4A-4F illustrate example sound environments correspond to particular environment parameters, listener reverb metric, and sound source metrics, according to certain aspects of the disclosure. Referring to FIG. 4A, a party popper sound event 402a is illustrated with the resulting flutter of confetti shown in the sound environment depicted by FIG. 4A of a game rendered via a flexible reverb playback architecture of a game platform. The party popper sound event 402a has certain acoustic characteristics (e.g., physically based acoustics for modeling impulse response reverb in a game world) including a specific reverberation corresponding to a fit of available reverbs to acoustic parameters corresponding to the popper sound event 402a. For example, the fit may be a best fit of values for available discrete reverbs to satisfy desired acoustic parameters. The game platform may crossfade between selected reverbs of the available discrete reverbs.

The desired acoustic parameters can be overall acoustic parameters derived from a combination of source reverb metric, listener reverb metric, relative positions, and sound-specific tuning parameters. For example, the sound-specific tuning parameters may be volume and distance scale tuning parameters. For example, the overall acoustic parameters can include a dry volume acoustic parameter, a wet volume acoustic parameter, an attenuation acoustic parameter, a filtering acoustic parameter, a bandpass filter width acoustic parameter, a bandpass filter gain acoustic parameter, a reverb volume acoustic parameter (e.g., three sets of reverb volume parameters), an early reflection volume acoustic parameter, and/or the like. In other words, the acoustic parameters can be used in a physically based acoustics process to determine a volume change (e.g., change in volume such as volume attenuation, dry signal attenuation), a filtering characteristic (e.g., sound muffling if sound source is confined such as being behind a door) and how much of a sound in the sound environment should be routed through the selected available discrete reverbs.

The physically based acoustics process may be applied to every sound in the sound environment. A health bar 407 of a player 404a in the sound environment may be shown. The health bar 407 can track the health of the player 404a while playing a game rendered by a game platform. The reverb applied for the sound rendered in the sound environment in FIG. 4A may depend on both one or more local environment reverbs and one or more world environment reverbs. For each of the sound environments depicted in FIGS. 4A-4F, the overall acoustic parameters can be used as a basis to determine a blend of selected available discrete reverbs and corresponding wetness values. That is, the selection of discrete values at wetness values can be a best fit according to acoustic parameters corresponding to the sound environment of a "room" within the game, rather than a specific main reverb parameter being used. As an example, for the sound environment of FIG. 4A, the available discrete reverbs may include local environment reverbs such as a small concrete reverb, a large concrete reverb, a woody reverb and world environment reverbs such as a city center world reverb.

The available discrete reverbs may depend on a type of the game platform, such as a performance capability of the game platform. As an example, discrete concrete size type reverbs calculated at runtime for a higher performance capability platform may include the small concrete reverb, a medium small concrete reverb, a medium concrete reverb, medium large concrete, and large concrete reverb. Conversely, discrete concrete size type reverbs calculated at runtime for a lower performance capability platform may include only the small concrete reverb and the large concrete reverb, for example. The size and wetness of the available discrete reverbs can be determined by one or more parameters of the overall acoustic parameters such as the three sets of reverb volume parameters, the dry volume acoustic parameter, and the wet volume acoustic parameter being used to determine a wetness value for each of the selected discrete reverbs.

The reverb size and wetness defined by the overall acoustic parameters can be calculated as a combination (e.g., sum) of sound source location (e.g., location of the party popper), listener location (e.g., location of player 404a or game camera location), and the corresponding sound source reverb metrics positioned at the sound source location and listener metrics positioned evenly around the listener location as well as the sound-specific tuning parameters. The reverb size may represent the size of a room in the game that a user (represented by player 404a, for example) is located in and can be measured on a size scale spanning 0 (tiny room) to 1 (huge room). For example, a concrete reverb size of 0.5 may be represented by a discrete medium concrete reverb. The wetness value may represent the volume of sound sent to the corresponding reverb that was assigned the wetness value. As an example, if the selected available discrete reverbs are the small concrete reverb (e.g., of concrete reverb size less than 0.5), the large concrete reverb (e.g., of concrete reverb size greater than 0.5), the woody reverb, and the city center world reverb, then the volume parameter values for each of these discrete reverbs can be determined based on derived overall acoustic parameters.

The derived overall acoustic parameters can include an assessment of concrete size (e.g., corresponding to reverb size parameter), concrete wetness (e.g., corresponding to reverb wetness parameter), and woodiness that are blended to determine the respective volume parameter values, which represents how much of an emitted sound is sent to each of the selected local reverbs. Accordingly, the derived overall acoustic parameters for the sound environment of FIG. 4A may cause assignment of volume values: 0.25 assigned to the small concrete reverb, 0.75 associated to the large concrete reverb, and 0.25 assigned to the woody reverb. The volume parameter values may range from 0 (silence) to 1 (full volume) and represent a weighting of how much of an emitted sound goes to a particular reverb. World environment acoustic parameters such as size, wetness, openness, and/or the like can be used to determine a volume parameter value for the city center world reverb. In this way, the reverb of a sound rendered for different sound environments of the game can simulate those environments with greater accuracy and scalability depending on what hardware game platform is used.

Figure 4B:
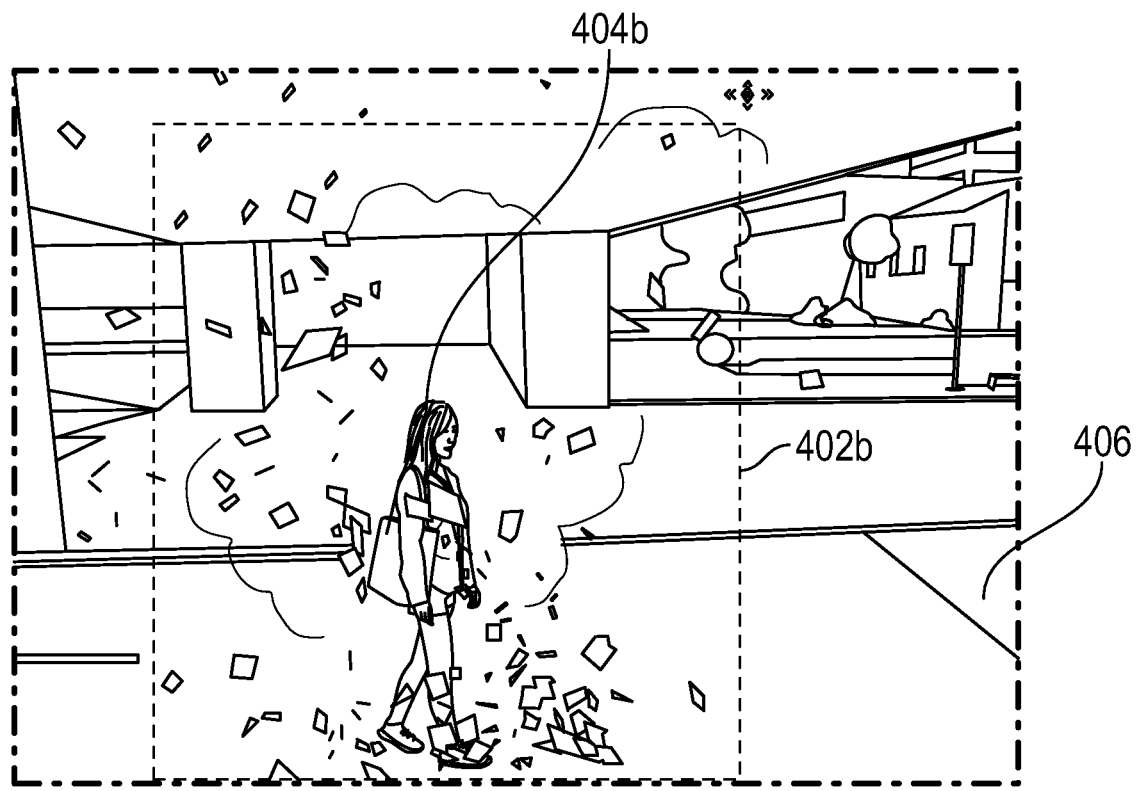

As an example, an asphalt reverb could be used and assigned a discrete value in the possibility space for the asphalt reverb based on the derived overall acoustic parameters for the environment of FIG. 4A, such as an assessment of asphalt size and asphalt wetness in the game space. For example, the asphalt street 406 in the game space of FIG. 4A may indicate that an available medium large asphalt discrete reverb should be selected based on the game space primarily comprising asphalt (e.g., ~70%). Referring to FIG. 4B, the overall acoustic parameters may be different from those used for FIG. 4A because the relative listener position has changed relative to the position in FIG. 4A. The listener position for the game space/sound environment of FIG. 4B can be the same as the location of a player 404b. In contrast to the position of player 404a on the street, the player 404b is standing on a concrete sidewalk 408. As such, the best fit of available reverbs to satisfy the overall acoustic parameters for the party popper sound event 402b can be different. Based on the composition of the game space of FIG. 4B (e.g., runtime metrics being used to calculate the sound environment having a concrete size of 0.8), the medium large concrete reverb or a weighted blend of the small concrete reverb and large concrete reverb may be selected.

The overall acoustic metrics can be calculated based on the listener metrics (e.g., derived from raycasts sent out around the listener position) positioned at the listener position (position of player 404b, camera location in FIG. 4B, etc.), sound source reverb metric positioned at the location of the party popper sound event 402b (e.g., the party sound event 402b is assigned reverb metrics of their nearest components), and the sound-specific tuning parameters. As an example, the overall acoustic metrics can correspond to a concrete reverb size and wetness as well as a woodiness reverb size and wetness. As an example, a best fit blend of the medium large concrete at volume value 0.8 and woody reverb at volume value defines an amount of the party popper sound event 402b sound being sent to the two selected reverbs to satisfy the determined overall acoustic metrics.

Figure 4C:
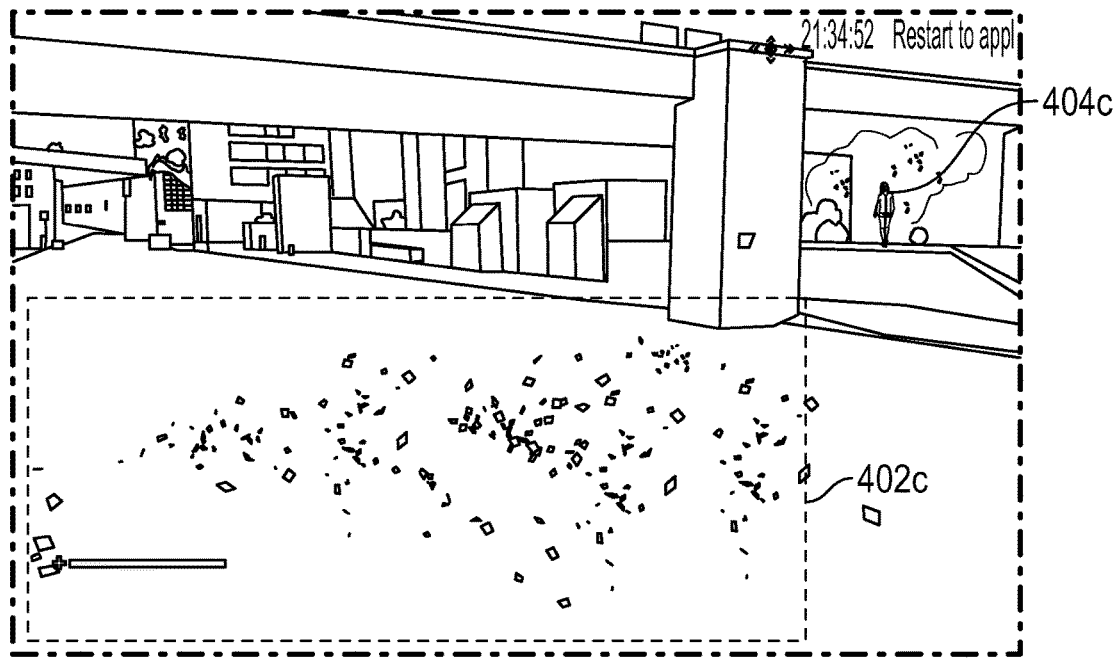

Referring to FIG. 4C, the overall acoustic metrics may be calculated differently due to a different relative listener position for the party popper sound event 402c. The listener position for the game space and sound environment of FIG. 4C can be different from the position of player 404c. For example, a camera view for the game space in FIG. 4C may be a wide shot rather than a point of view (POV) camera angle as used in FIGS. 4A-4B. The camera or listener position may be located relatively remotely from the party popper sound source in FIG. 4C. In this situation, the reverb wetness or volume as represented by the overall acoustic metrics and/or reverb metric volume values may be reduced based on the relatively greater distance between the listener position and the position of player 404c. As an example, two discrete reverbs large asphalt reverb and small concrete reverb may be selected and assigned relatively low volume values, such as 0.1 and 0.2 respectively. In this way, less sound from the party popper sound event 402c is routed via the selected reverbs because of the increase in relative listener/sound source positions.

Figure 4D:
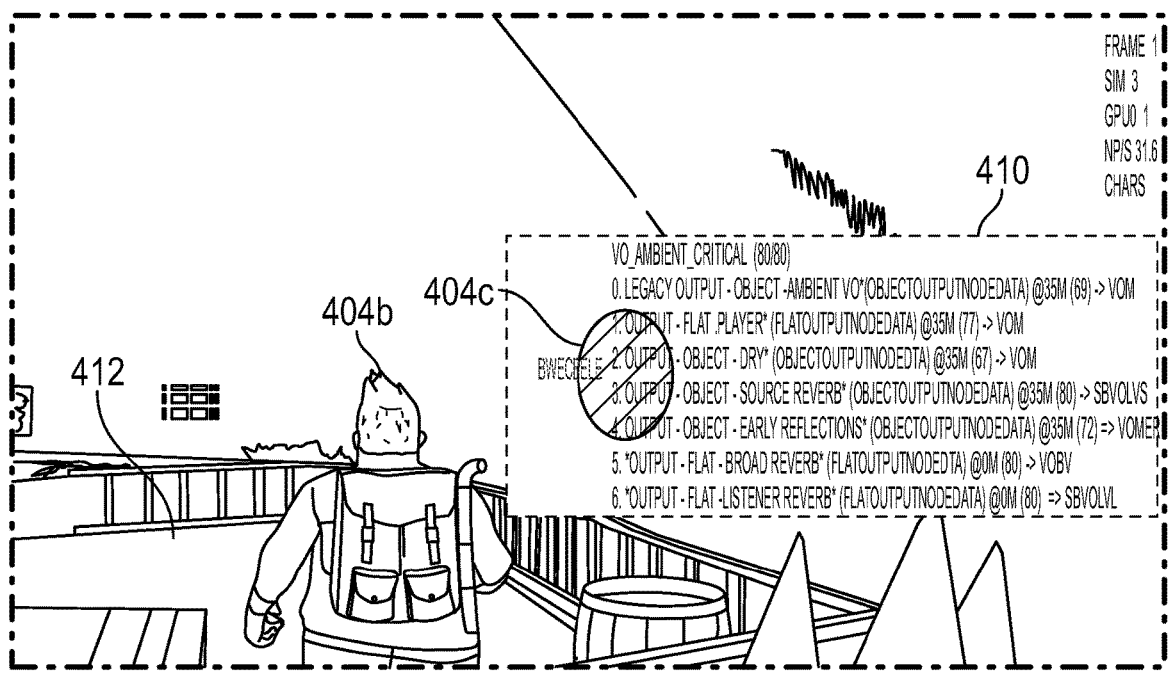

Referring to FIG. 4D, the overall acoustic parameters for an emitted sound may be indicated in an acoustic parameter display area 410. The game space shown in FIG. 4D depicts a dungeon including a guard 404b standing on a balcony 412 and a playable character 404c. The overall acoustic parameters may be changed depending on relative position of emitted sound. For example, the playable character 404c may say some dialogue and consequently become a sound source. In the game space of FIG. 4D, the listener position may correspond to a high wide shot. Accordingly, the relative distance between the listener position and the sound source position (location of the playable character 404c) may change as the playable character 404c runs around the dungeon. Derived overall acoustic parameters can change as the relative position corresponding to calculated source reverb metrics and listener reverb metrics change. As an example, the values and/or parameters in the acoustic parameter display area 410 may change as the location of the playable character 404c changes.

The acoustic parameter display area 410 may include acoustic parameters such as player volume, dry volume, source reverb volume, early reflection volume, broad reverb, listener reverb volume, and/or the like. The acoustic parameter display area 410 can update as the location of the playable character 404c or any other relevant input for the acoustic parameters changes. The sound-specific tuning parameters can also be modified as the playable character 404c moves around the dungeon of FIG. 4D. For example, the sound-specific tuning parameters can include volume and distance scale that vary proportionally to the listener/camera position (e.g., volume and distance scale increases and decreases as relative distance from camera and emitted sound from playable character increases and decreases, respectively). This way, the sound-specific tuning parameters may accurately describe sound attenuation over distance.

Figure 4E:
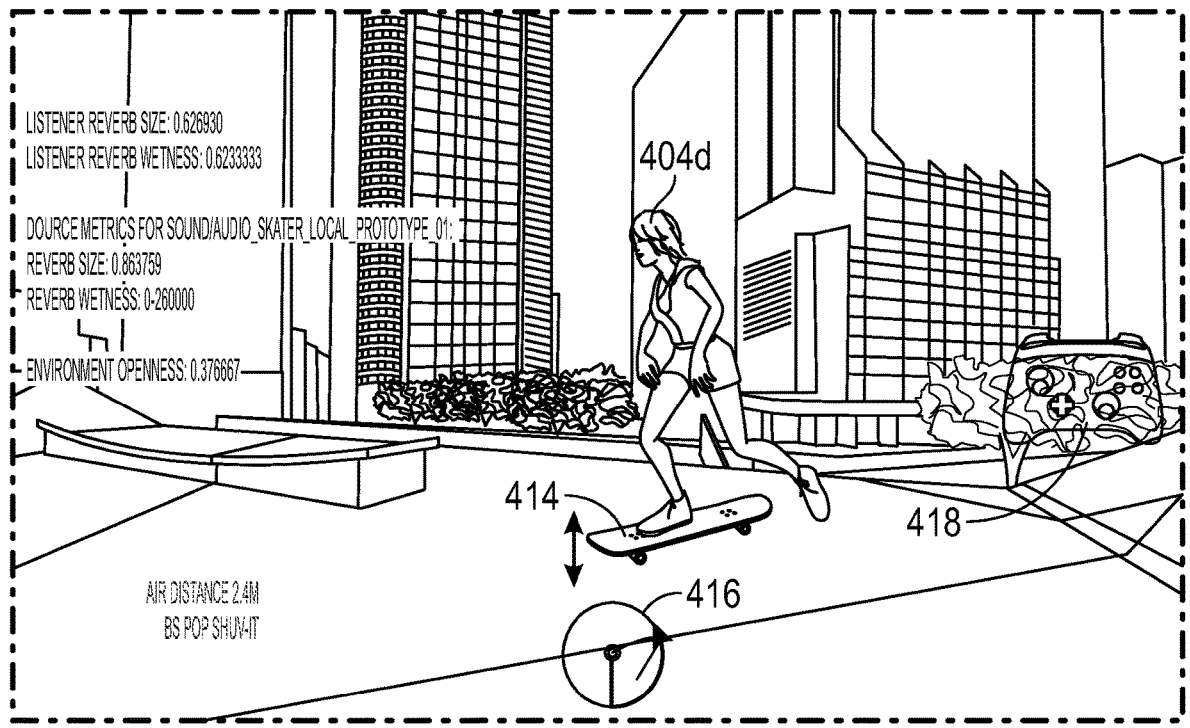

Referring to FIG. 4E, a game space including a skateboarder player 404d is shown interacting with a world city environment. The skateboarder player 404d can generate a sound based on performing an aerial maneuver on a skateboard such that the impact of the skateboard on the ground after jumping generate the sound and corresponding reverberation. The volume of the sound and the reverberation may depend on the distance of the jump, as indicated by the double ended arrow indicator 414. The control circle 416 may be used to control the aerial maneuver performed by the skateboarder player 404d. The sound source reverb metrics and listener reverb metrics corresponding to the source metric node 306 and the listener metric node 308 can be determined based on performing raycasting from the point where the skateboard impacts the concrete ground (e.g., sound source) and from the listener position (e.g., slightly behind the POV of the skateboarder player 404d).

For example, as shown in FIG. 4E, a listener reverb size parameter can be 0.626930 and a listener reverb wetness parameter can be 0.62333. For example, a skateboard sound source reverb size parameter can be 0.863759 and a skateboard sound source reverb wetness parameter can be 0.260. The reverb metric parameters of derived acoustic parameters for a game space rendered by the game platform may be determined based on the characteristics of the game space. For example, the reverb size may be determined based on a size of the room considering that a larger reverb size increases delay lengths of the reverb network being used to render audio of the game space while a smaller reverb size decreases delay lengths. The room of FIG. 4E may depict an open skate park surrounded by skyscrapers of a city center, which is a large expansive space corresponding to large reverb size and longer delay lengths.

Accordingly, the listener and source reverb sizes in FIG. 4E are relatively large. The reverb wetness may be determined based on the quantity of close surfaces (e.g., walls, ceilings, etc.) that a sound reverb may bounce off of. Because the room of FIG. 4E is relatively expansive, there are relatively fewer surfaces for reverberation and accordingly, the listener and source reverb sizes in FIG. 4E are relatively small. The expansiveness can be represented by an environment openness parameter, which can be 0.376667 in FIG. 4E. The derived acoustic parameters may be used to select discrete reverbs in a possibility space, as discussed above, including local reverbs such as small concrete reverb (e.g., concrete platform), wood reverb (e.g., trees), large concrete reverb (e.g., large concrete skate park) and including world reverbs such as a city center reverb.

Figure 4F:
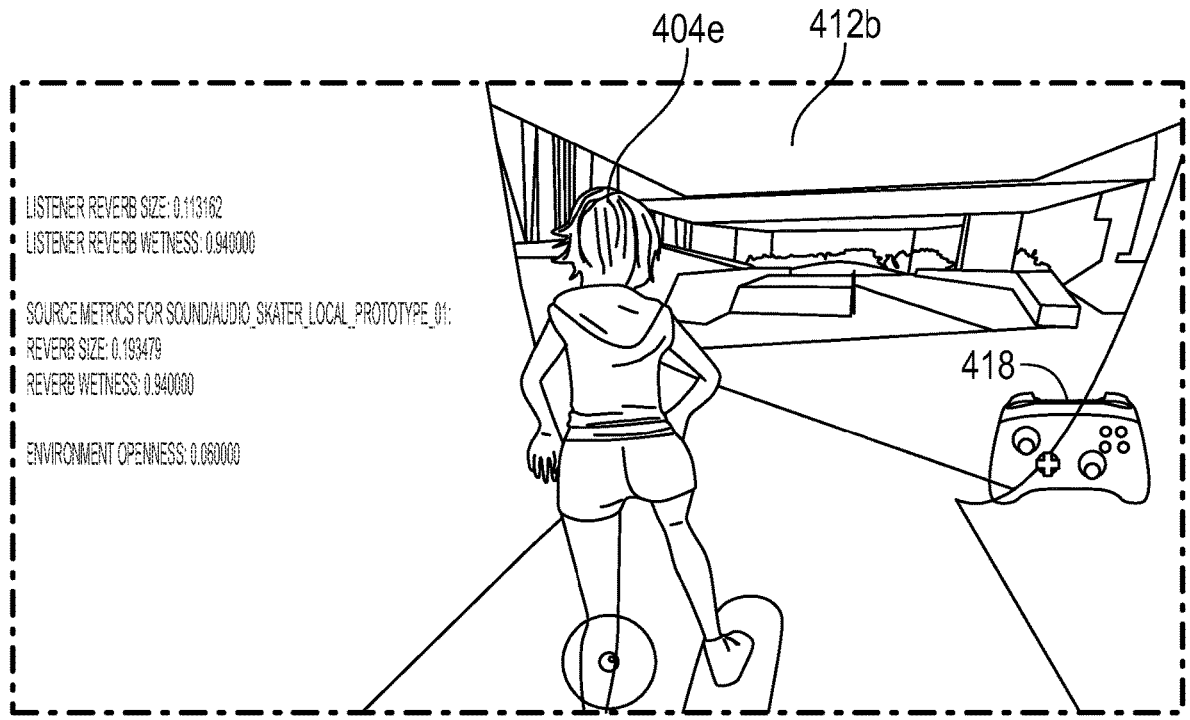

Referring to FIG. 4F, the sound environment of the depicted game space may be smaller and more constrained than that of FIG. 4E. For example, as shown in FIG. 4F, a listener reverb size parameter can be 0.113162 and a listener reverb wetness parameter can be 0.940000. For example, a skateboard sound source reverb size parameter can be 0.193479 and a skateboard sound source reverb wetness parameter can be 0.94000. The room of FIG. 4F may depict a constrained particular portion of the skate park in the city center, which is a smaller limited space corresponding to smaller reverb size and less delay lengths. Accordingly, the listener and source reverb sizes in FIG. 4F are relatively small compared to the listener and source reverb sizes in FIG. 4E.

Because the physical space of FIG. 4E has more distant surfaces, the listener and source reverb size in FIG. 4E are relatively large compared to the reverb sizes in FIG. 4F. However, because fewer directions contain objects at all in, as opposed to "open sky," the wetness in FIG. 4E is relatively small compared to FIG. 4F. The constrained space of FIG. 4F can be represented by an environment openness parameter, which can be 0.06 in FIG. 4F. Each of the parameters can range from a minimum of 0 to a maximum of 1. The emitted sound source in FIG. 4F may result from the friction from the skateboarder player 404d skating along the concrete floor of the constrained portion of the skate park. The derived acoustic parameters may be used to select discrete reverbs in a possibility space, as discussed above, including local reverbs such as medium concrete reverb (e.g., concrete walls of constrained concrete skate park), wood reverb (e.g., trees), and including world reverbs such as the city center reverb. In this way, the determined reverbs and acoustic parameters for rendering audio of the various game space and sound environments in FIGS. 4A-4E may be more accurate and scalable across different game platforms.

Figure 5A:
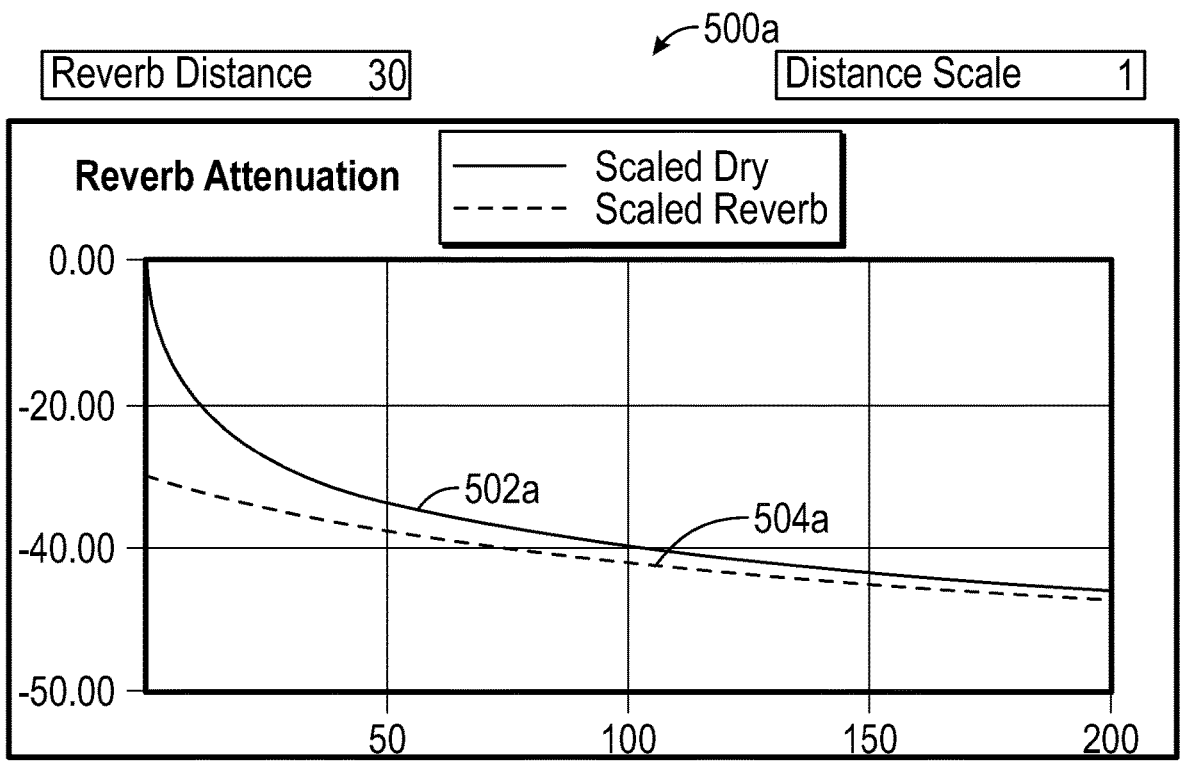
FIGS. 5A-5B are example graphs measuring reverb attenuation based on distance scale, according to certain aspects of the disclosure.
Figure 5B:
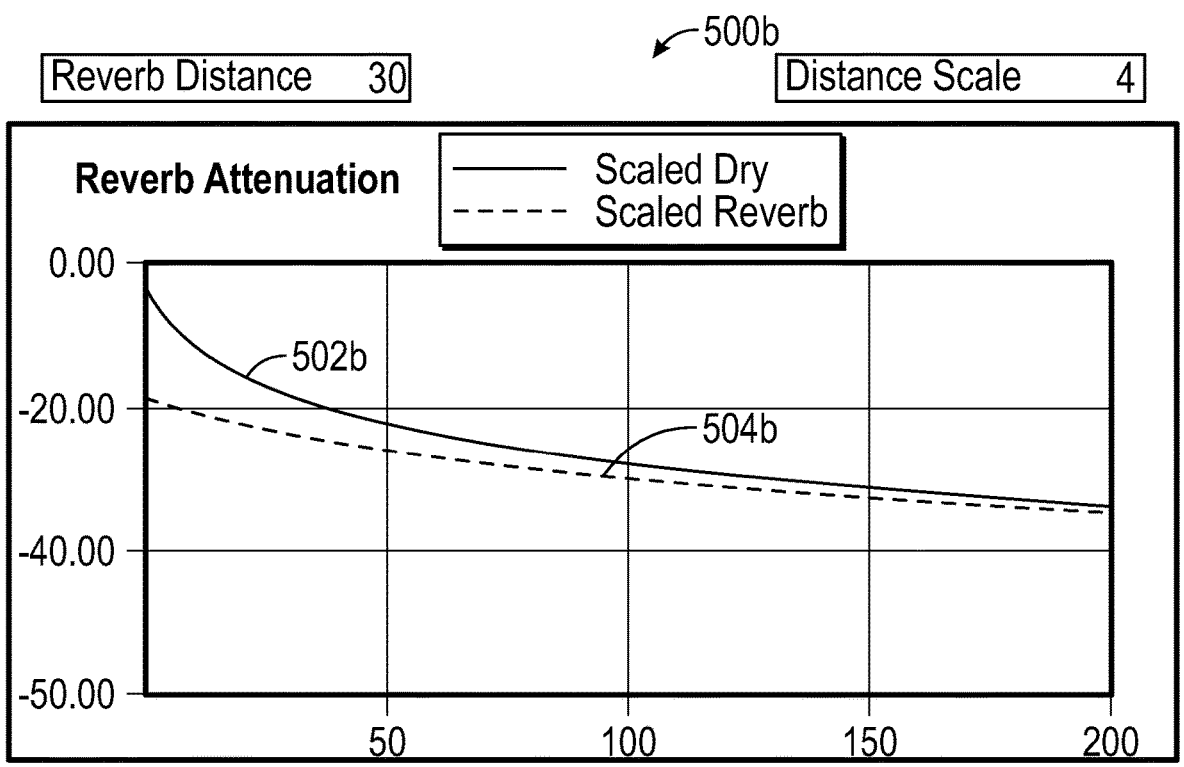

FIGS. 5A-5B are example graphs 500a-500b measuring reverb attenuation based on distance scale, according to certain aspects of the disclosure. The graphs 500a-500b may reflect the use of sound-specific tuning parameters for audio for a game rendered by a game platform. As an example, the sound-specific tuning parameters may include volume, distance scale, and/or the like. Reverb attenuation may define how quickly a reverb distance changes over time. Reverb attenuation calculations may be part of determining physically based acoustics by a flexible reverb playback architecture of the game platform.

Physically based acoustics can refer to a design that simplifies the generation of an amount of reverb and an amount of volume attenuation that each sound source within a sound environment receives. The physically based acoustics can involve a relatively small number of parameters that generally corresponds to the world sound environment and playback architecture being used that is scalable (e.g., to a variety of sound environment situations) and without undesired outlier scenarios. For example, the physically based acoustics can involve only tuning volume and distance scale tuning parameters in most scenarios with more customized tuning being used only for limited exceptional circumstances. Other tuning parameters such as a particular reverb send level can be calculated based on the volume and distance scale tuning parameters.

Reverb send and return levels may enable applying a reverb effect on each sound of a mix of multiple sounds. The physically based acoustics can be sound tuned or tagged per sound source as part of a back end tuning process. For example, a reverb attenuation curve may be used to tune a party popper sound comprising a pop component and a flutter component. That is, for a particular sound event such as a party popper, the graphs 500a-500b may reflect a quantity of reverb attenuation desired by a sound designer. As an example, the pop component should have a higher distance scale than the flutter component so that both components behave appropriately at distance. In this way, the pop component would stay audible at a further away distance compared to the flutter component. This may derive from a sound designer causing the volume of the naturally loud pop component to be adjusted artificially lower at game runtime (e.g., during gameplay) because the pop component is too loud and causing the volume of the naturally quiet flutter to be adjusted louder because the flutter is an interesting sound.

The quantity of sound attenuation may be measured according to the distance scale. The distance scale may define an extent (e.g., stretching out a standard distance attenuation curve) of the distance attenuation curve. That is, stretching out the curve causes reverbs to become quieter at a slower rate. The standard distance attenuation curve can be a generally realistic curve. That is, attenuation increases with distance. Distance attenuation may define how quickly a reverb gets quieter at a distance. The distance attenuation can be determined or tuned for each sound rendered in a sound environment by the game platform. As an example, the sound designer may select a single number for volume with a single number for distance scale, which can indicate how quickly a reverb attenuates in scale.

The distance scale may be used to configure and/or automate reverb send levels indirectly. For example, for the party popper sound, it may be desirable to tune the pop component so that it is more reverberant than the flutter component, because the pop component is an interesting sound that should be heard bouncing off of surfaces loudly while the flutter component may represent the sound of fluttering paper that should not be heard bouncing off of surfaces loudly. The reverb send levels required for this desired tuning behavior may be calculated based on a particular distance scale. As an example, the distance scale may be set differently between the pop component (e.g., set high) and the flutter component (e.g., set low), the distance attenuation may be different. That is, for the high distance scale pop component and low distance scale flutter component, a higher distance reverb attenuation for the flutter component relative to a lower distance reverb attenuation for the pop component is achieved.

In this way, the pop component reverberates more than the flutter component (e.g., the pop component bouncing off two city blocks is audible, but not for the flutter). In general, the distance scale may define how quickly a reverberation ceases or dies off. In other words, a higher distance scale may cause an increase in wetness of an audio reverb signal at distance such that the reverb signal is more audible at distance (e.g., stays audible for longer). As such, as shown in the graphs 500a-500b which can represent local and world reverb sends, the corresponding wet reverb signal may stay reverberant at distance, such as staying reverberant at approximately 30 meters and 100 meters (e.g., distance attenuation), respectively. This means that the distance scale tuning parameter may be used to compress dynamic range, which keeps certain sounds reverberant at certain greater distances.

The graphs 500a-500b demonstrate this compression and reverb attenuation, as indicated using volume measured on the y axis and distance measured on the x axis. As shown on the graphs 500a-500b, the scaled reverb signals 502a-502b experience relatively quick reverb attenuation from 0 meters to 200 meters, particularly from 30 meters to 100 meters and even more particularly from 0 meters to 30 meters. As shown on the graphs 500a-500b, the scaled reverb signals 504a-504b experience relatively slower reverb attenuation from 0 meters to 200 meters, particularly from 30 meters to 100 meters and even more particularly from 0 meters to 30 meters. This illustrates the use of distance scale to tune reverb send levels so that the pop component can stay more reverberant at distance than the flutter component. The reverb sends can be calculated for both a world environment and a local environment of the game. For example, the world environment may correspond to the 100 meters to 200 meters range of distance attenuation (e.g., a reverb stays reverberant up to the 100 to 200 meter range). For example, the local environment may correspond to the 30 meters range of distance attenuation (e.g., a reverb stays reverberant up to the 30 meter range).

Figure 6A:
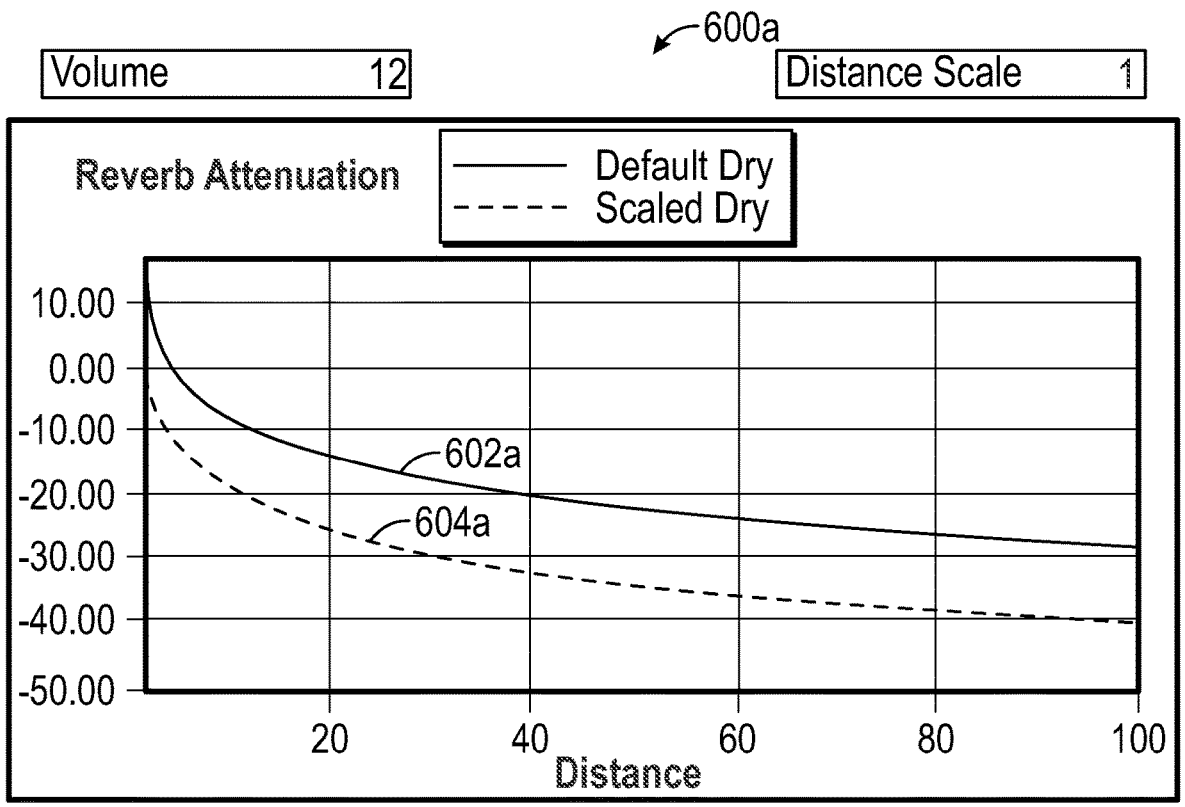
FIGS. 6A-6B are example graphs measuring distance attenuation based on volume and distance scale, according to certain aspects of the disclosure.
Figure 6B:
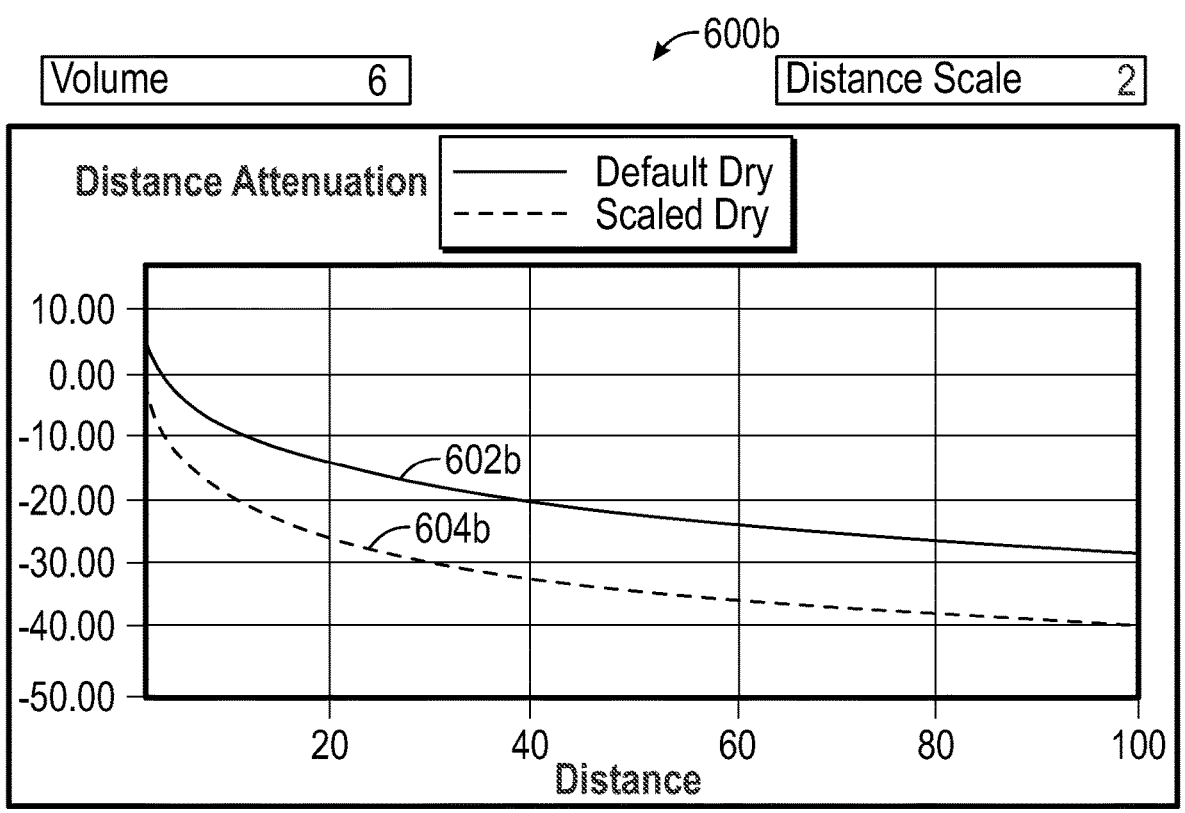

FIGS. 6A-6B are example graphs 600a-600b measuring distance attenuation based on volume and distance scale, according to certain aspects of the disclosure. The graphs 600a-600b may reflect the use of sound tuning parameters for audio for a game rendered by a game platform. As an example, the sound-specific tuning parameters may include volume, distance scale, and/or the like. The sound-specific tuning parameters may be selected or adjusted as a menu option available to a sound designer for the game, for example. Distance attenuation may define how quickly a reverb gets quieter at a distance. The distance attenuation can be determined or tuned for each sound rendered in a sound environment by the game platform. For example, the distance attenuation may be used to compress a dynamic range in a close range environment. The distance attenuation can be measured based on a distance scale parameter. The quantity of sound attenuation may be measured according to the distance scale parameter.

Distance scale may be a physically based acoustics parameter that is configurable via the game platform. The distance scale may define an extent (e.g., stretching out a standard distance attenuation curve) of the distance attenuation curve. That is, stretching out the curve causes reverbs to become quieter at a slower rate. Accordingly, two reverbs which have the same volume at close range would have different volumes at distance (e.g., far distance) if the distance attenuation curve of one of the reverbs is modified in this manner. For example, doubling the distance scale can cause 6 decibels (dBs) to be added at far distance, which can compress the dynamic range of sound for the game. The compressed dynamic range may be valuable in situations where the game cannot accommodate an expanded dynamic range. As an example, for a party popper sound comprising a pop component and a flutter component, a sound designer may desire the pop component to be 12 dBs louder than the flutter component but the game cannot support 12 dBs because that would be an excessively large dynamic range.

In this situation, the distance scale parameter may be doubled and tune the volume parameter. Tuning the volume parameter may involve determining relative volumes between different sounds such as the pop component and the flutter component. For example, the volume parameter may be set such that the volume difference between the pop component and the flutter component is decreased to 6 dBs (e.g., at close range). When the volume parameter is combined with the double distance scale, the pop component may be 12 dBs higher than the flutter component at distance as desired. This combination of volume and distance scale tuning parameters can be used to tune for different reverbs in a limited dynamic range settings, as illustrated by graphs 600a-600b. The graphs 600a-600b demonstrate the desired distance attenuation effect described above, as indicated by volume measured on the y axis (e.g., measured in dBs) and distance measured on the x axis (e.g., measured in meters).

As shown on the graph 600a, the difference between a default reverb signal 602a and a scaled reverb signal 604a may be 10 dBs at close range (e.g., at close to 0 meters in distance) prior to setting the volume parameter. At range (e.g., further away than 0 meters), the difference between a default reverb signal 602a and a scaled reverb signal 604a may still be 10 dBs. However, as shown on the graph 600a, when the distance scale and volume are tuned, the default difference between a default reverb signal 602b and a scaled reverb signal 604b may be reduced at close range, such as to 6 dBs, while changing at distance. Moreover, at distance such as at 30 meters, the doubling of distance scale and volume tuning of the default reverb signal 602b relative to the scaled reverb signal 604b may cause the scaled reverb signal 604b to be 12 dBs louder at distance. That is, the distance scale and volume tuning parameters may be tuned such that the scaled reverb signal 604b is 6 dBs louder than the default reverb signal 602b at close range and 12 dBs louder at distance, as desired by a sound designer to accommodate limited dynamic range.

Physically based acoustics can refer to a design that simplifies the generation of an amount of reverb and an amount of volume attenuation that each sound source within a sound environment receives. The physically based acoustics can involve a relatively small number of parameters that generally corresponds to the world sound environment and playback architecture being used that is scalable (e.g., to a variety of sound environment situations) and without undesired outlier scenarios. For example, the physically based acoustics can involve only tuning volume and distance scale tuning parameters in most scenarios with more customized tuning being used only for limited exceptional circumstances.

Other tuning parameters such as a particular reverb send level can be calculated based on the volume and distance scale tuning parameters. The physically based acoustics can be sound tuned or tagged per sound source as part of a back end tuning process. As an example, distance scale may be configured to emphasize distance or sparseness of a room or object, such as adjusting the reverb of a sound to create an exaggerated sense of scale or proximity. In this way, the volume and distance scale sound tuning parameters enable sound to be generally tuned well for unpredictable environments, such as user generated content and environments in a sandbox context. Advantageously, this may limit the amount of costly custom sound tuning that should be performed for outlier environments.

Figure 7A:
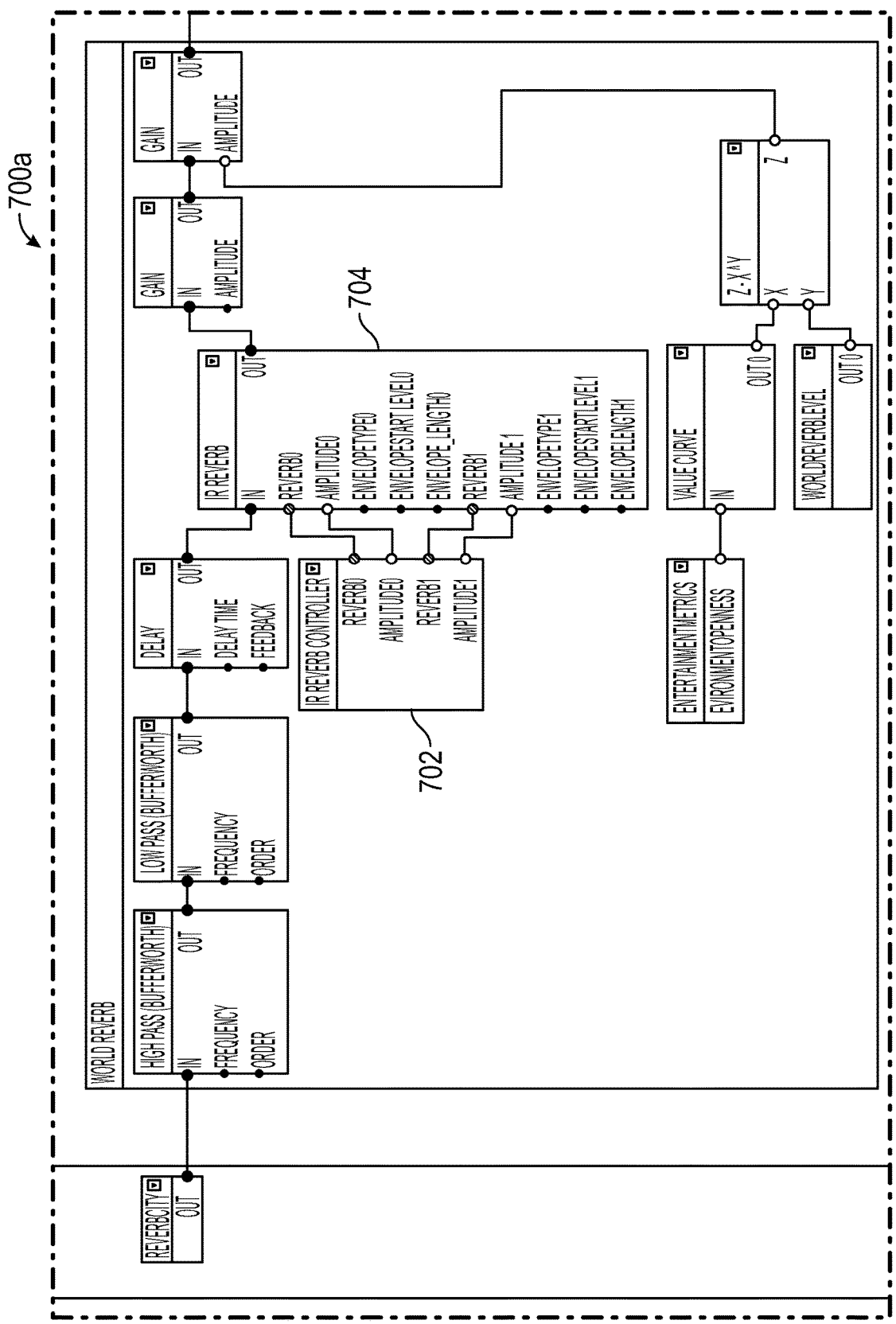
FIGS. 7A-7B are block diagrams illustrating derivation of acoustic parameters, according to certain aspects of the disclosure.
Figure 7B:
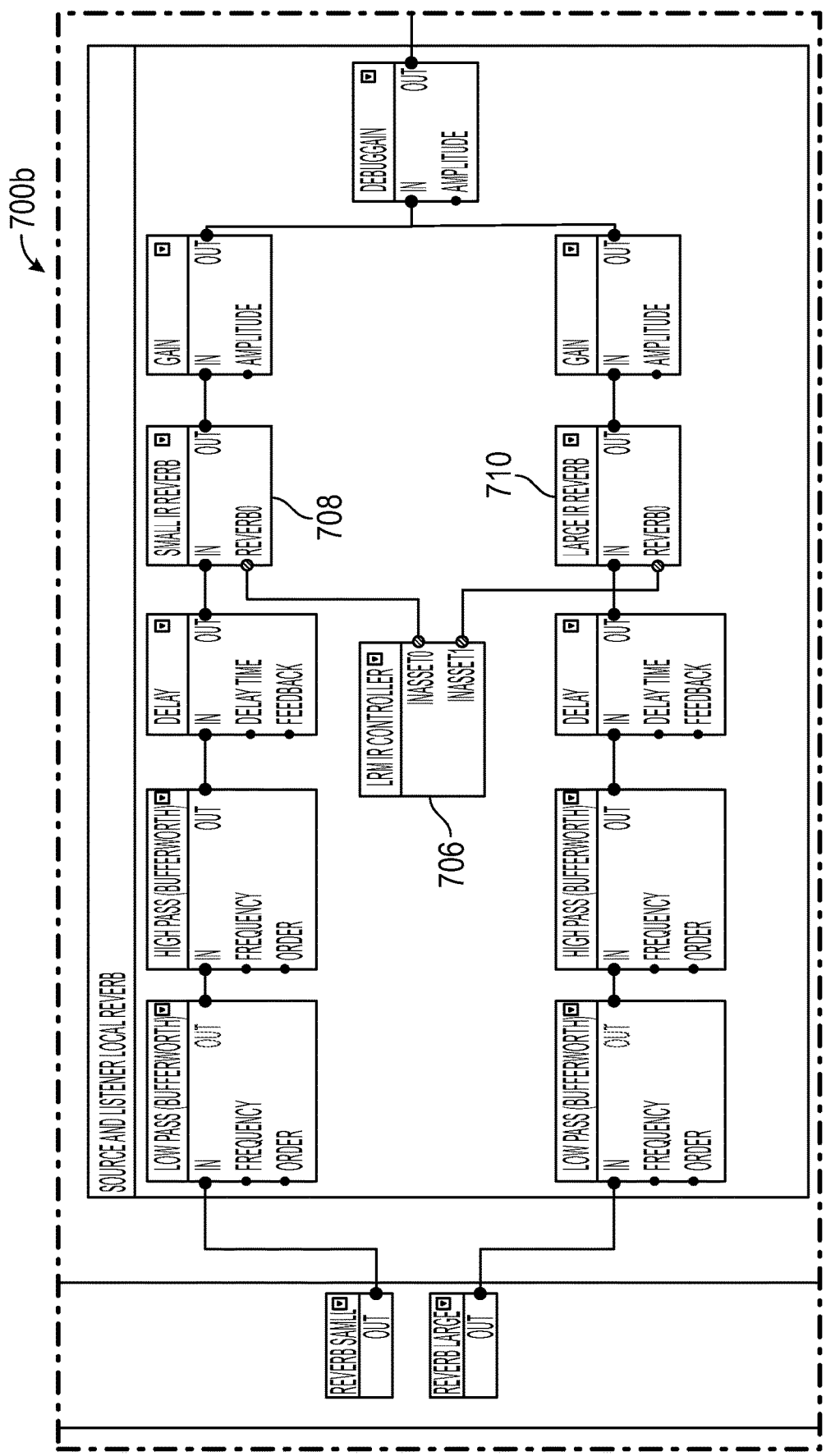

FIGS. 7A-7B are block diagrams 700a-700b illustrating derivation of acoustic parameters, according to certain aspects of the disclosure. For example, the derivation of the acoustic parameters can be performed by a flexible reverb playback architecture of a game platform. The derivation of acoustic parameters may be performed for a crossfade between a number of static reverbs. The crossfading may be performed by an impulse response (IR) reverb controller 702 for crossfading an IR node 704 according to sound areas of a level schematic corresponding to the flexible reverb playback architecture. The sound areas can correspond to portions of a sound environment rendered by the game platform.

FIG. 7A can show an acoustic parameter derivation for a world reverb environment by the flexible reverb playback architecture. The world reverb environment may refer to audio reverberation for a particular "room" or space within the game (e.g., any general space within the world reverb environment) and what the characteristics for the game space are. For example, a world reverb environment may be a canyon, a forest, a city, and/or the like. For example, the block diagram 700*a* for the flexible reverb playback architecture may indicate a city world reverb connected to the overall acoustic parameters for the city world reverb. As an example, the overall acoustic parameters may include dry volume acoustic parameter, a wet volume acoustic parameter, an attenuation acoustic parameter, a filtering acoustic parameter, a bandpass filter width acoustic parameter, a bandpass filter gain acoustic parameter, a reverb volume acoustic parameter, or an early reflection volume acoustic parameter.

The IR reverb controller 702 can include attributes include reverb and corresponding amplitude attributes that may connect and/or crossfade with the IR node 704 to blend the reverbs and audio characteristics corresponding to the static reverbs selected for the city world reverb. For example, the IR reverb controller 702 can be configured to crossfade between reverbs such as reverb 0 and reverb 1 depending on a listener's position in the world (the world environment of the game being rendered). The crossfade based on listener position may change/update every 100 or 200 meters. For example, the number of static reverbs may depend on the performance capability of the game platform being used to render audio for a game. For example, more convolutional hardware/software reverbs and/or higher quality reverbs within the reverb possibility space can be added as the performance capability increase. The size of each of the static reverbs can vary depending on the complexity of a corresponding space in the game.

As shown in FIG. 7A, the IR reverb controller 702 and IR node 704 can be connected to other nodes representing acoustic parameters in a world reverb block of the block diagram 700*a*. The acoustic parameter nodes include a high pass band filter node, a low pass band filter, a delay node, a gain node, an environment metrics node, a value curve node, a world reverb level node, and an additive node (e.g., z=x+y). The high pass band filter node can have attributes in, out, frequency, and order. The in and out attributes may represent input and output while order may define the order of application of acoustic parameters. The high pass frequency attribute may be a cutoff frequency at which audio signals having a frequency lower than the cutoff frequency are cutoff. The low pass band filter node can also have attributes in, out, frequency, and order. The low pass frequency attribute may be a cutoff frequency at which audio signals having a frequency higher than the cutoff frequency are cutoff.

The delay node can have in, out, delay time, and feedback attributes. The delay time attribute may define a delay before initiation of an IR reverb. The delay node output can be connected to the IR node 704, which may have attributes of in, out, reverb 0, amplitude 0, envelope type 0, envelope start level 0, envelope length 0, reverb 1, amplitude 1, envelope type 1, envelope start level 1, envelope length 1. The IR node 704 may be connected to gain nodes having attribute in, out, and amplitude (e.g., defining reverb amplitude gain). The reverb amplitude gain may be defined by an environment metric node (e.g., environment openness), value curve, and world reverb level, such as a combination of the environment openness and value curve and the selected world reverb level.

FIG. 7B can show an acoustic parameter derivation for a local reverb environment by the flexible playback architecture. Acoustic parameters can be derived for a small local reverb environment and a large local reverb environment. The derivation of acoustic parameters may be performed using a fixed number of static reverbs. The fixed number of static reverbs used to sparsely span the possibility space can depend on or scale with the performance quality of game platform (e.g., audio playback hardware or software) being used. For example, a lower fidelity audio playback hardware or software may only support a small reverb and large reverb. However, for example, a larger fidelity audio playback hardware or software may be able to support a small reverb, a small medium reverb, a medium reverb, a medium large reverb, and a large reverb. For each sound source, a fit (e.g., best fit) crossfade between the static reverbs. As an example, the small local reverb may be a small urban reverb representing an alleyway and the large local reverb may be a large urban reverb representing a warehouse or bigger street. For each sound source, a crossfade between the small local reverb and the large local reverb may be determined.

The specific crossfade or blend of volume (e.g., how much sound is routed to each reverb) can be determined based on factors such as reverb size, wetness of overall reverb send level, and diffuseness to blend between overall reverb send level and early reflection. The LRM IR reverb controller 706 can be used to determine the specific small and large reverbs to apply to a signal. The small local reverb may correspond to the small IR node 708 and the large local reverb may correspond to the large IR node 710. The best fit of the small local reverb and the large local reverb can be determined based on acoustic parameters represented by acoustic parameter nodes in FIG. 7B. The acoustic parameter nodes in FIG. 7B may include a low pass band filter node, a high pass band filter, a delay node, a gain node, and a debug gain node. The low pass band filter node can also have attributes in, out, frequency, and order. The in and out attributes may represent input and output while order may define the order of application of acoustic parameters. The low pass frequency attribute may be a cutoff frequency at which audio signals having a frequency higher than the cutoff frequency are cutoff.

The high pass band filter node can have attributes in, out, frequency, and order. The high pass frequency attribute may be a cutoff frequency at which audio signals having a frequency lower than the cutoff frequency are cutoff. The delay node can have in, out, delay time, and feedback attribute. The delay time attribute may define a delay before initiation of an IR reverb. The delay node can be connected to either or both of the small IR node 708 and the large IR node 710 depending on the desired discrete reverb characteristics. The debug gain node can have in, out, and amplitude. The debug gain node can be used to troubleshoot the corresponding parameters of the delay node. As discussed above, the discrete number of selected static reverbs used to sparsely span the possibility space can depend on or scale with the performance quality of game platform (e.g., audio playback hardware or software) and the characteristics of the game space or world rendered by the game platform.

For example, if the rendered game urban environment corresponding to the small local urban reverb and the large local urban reverb also included trees, discrete forest reverbs could be included and crossfaded depending on sound source and listener locations and associated reverb metrics. The discrete forest reverb may sparsely populate the forest reverb possibility space depending on how large the forest is. Similarly, the urban reverbs may sparsely populate the urban reverb possibility space depending on small or large the urban environment is. For example, the discrete forest reverbs spans a spectrum of sparse to densely populated forest and the urban reverbs span a spectrum of small urban space to large urban space, respectively. In this situation, the particular selected discrete reverb indicates a size of urban area or a density of forest as well as a corresponding reverb metric associated with that size or density, respectively. As an example, the corresponding reverb metric capture reverb characteristics depending on a sound source or listener position within the urban area and forest (as well as how urban the area is and how dense the forest is, respectively). As an example, if the urban environment includes an airplane, a sound source reverb metric may have a reverb reflecting the position of the sound source, such as being under the airplane.

Figure 8A:
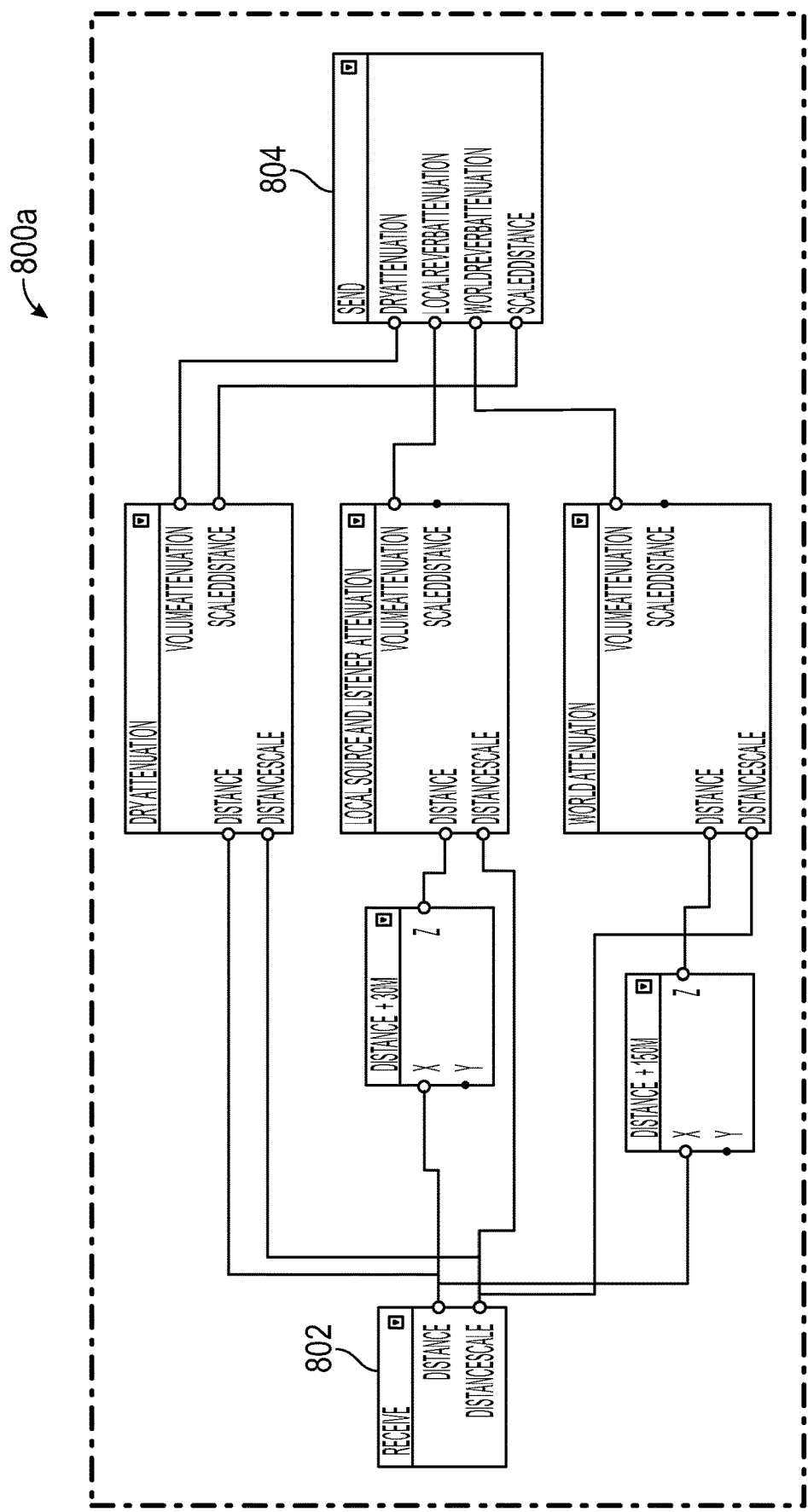
FIGS. 8A-8B are block diagrams illustrating the use of physically based acoustics by a flexible reverb architecture for rendering audio, according to certain aspects of the disclosure.
Figure 8B:
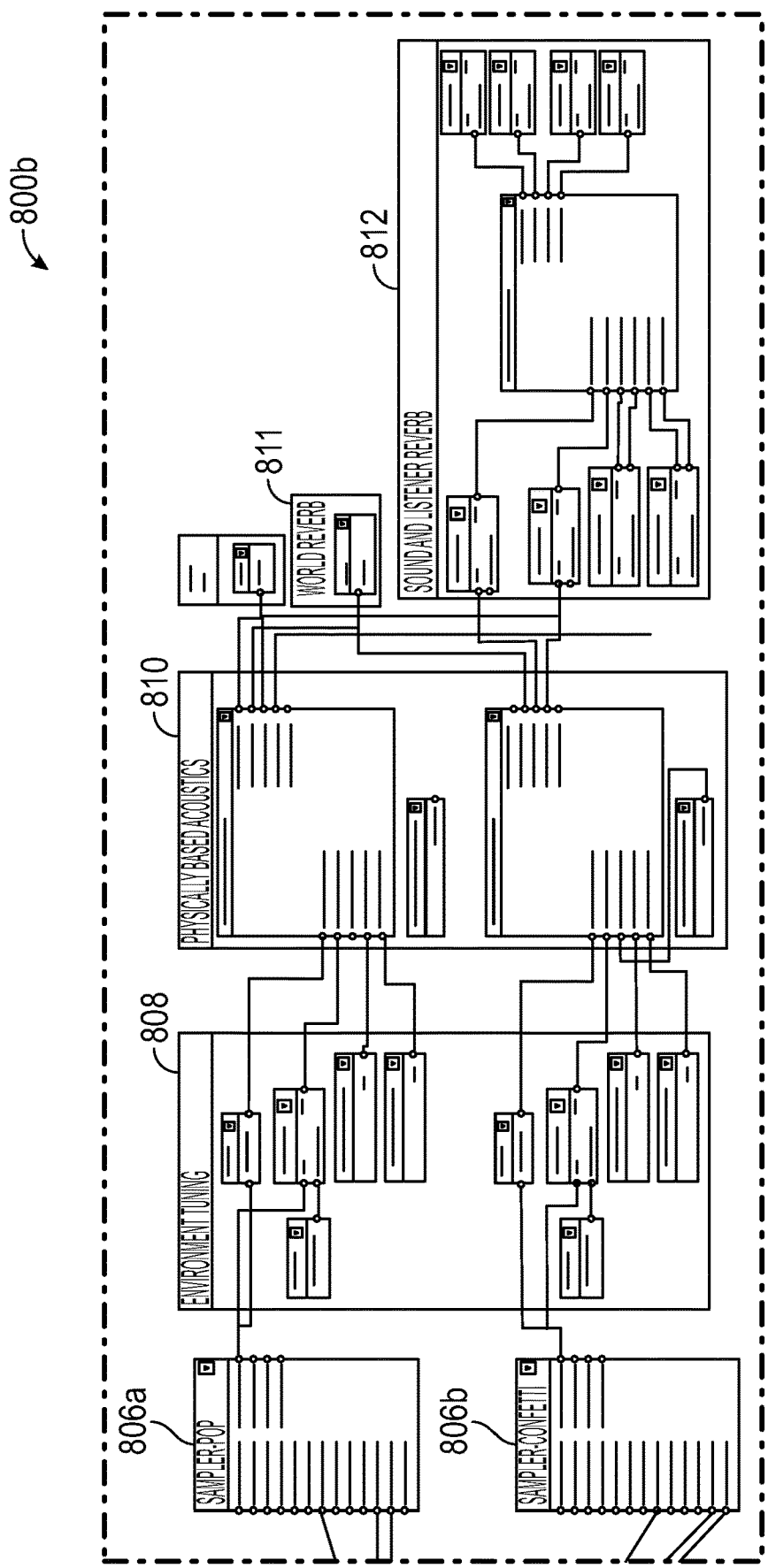

FIGS. 8A-8B are block diagrams 800a-800b illustrating the use of physically based acoustics by a flexible reverb architecture for rendering audio, according to certain aspects of the disclosure. Referring to FIG. 8A, the block diagram 800a shows physically based acoustics in a node graph including a reverb receive node 802, send reverb node 804, distance nodes, and attenuation nodes for rendering of audio in a game by a game platform. The reverb receive node 802 may be used to specify distance and distance scale parameters for sound tuning. The specified distance and distance scale can be used to determine an automated reverb send for each sound in a sound environment of the game. Also, the specified distance and distance scale may be used to determine reverb attenuation and distance attenuation, and volume difference as described above.

As an example, quiet sounds that are tuned via the block diagram 800a may receive little reverb from a local environment of the sound environment and may receive approximately no reverb from a world environment of the sound environment. In this way, a flutter component of a party popper sound event cannot be heard bouncing off of a world environment (e.g., city block, canyon wall etc.) but can be heard bouncing off of surfaces of relatively wet and enclosed spaces, as desired. In contrast, medium sounds may receive a medium amount of reverb from the local environment and slightly less than medium amount of reverb from the world environment. Loud sounds may be audible based on a very significant reverb from the world environment. For example, a pop component of the party popper may be heard bouncing off multiple city blocks.

The varying reverberation from the local environment and the world environment can be illustrated by the use of the distance nodes in the block diagram 800a. The distance nodes may include a 30 meter distance corresponding to the local environment and 150 meter distance corresponding to the world environment. The inputs to the distance nodes may include a distance parameter and distance scale parameter. As discussed above, the amount of reverb that a sound receives in the local environment (e.g., 30 meters) and the world environment (e.g., 150 meters) may be based on the distance parameter and distance scale parameter. As illustrated by parameters of a dry attenuation node, a local source and listener node, and world attenuation node, the input distance and distance scale parameters of the reverb receive node 802 may be used to determine volume attenuation and scaled distance outputs. The determined volume attenuation and scaled distance outputs may be used to determine distance attenuation and reverb attenuation for dry signals, attenuation in the local environment (e.g., for local sound source and local listener), and attenuation in the world environment, as described above. In this way, the send reverb node 804 may be used to output tuning parameter outputs that can be used to automate reverb send. The outputs from the send reverb node 804 may include dry attenuation, local reverb attenuation, world reverb attenuation, and scaled distance.

Referring to FIG. 8B, the block diagram 800b shows the use of a flexible reverb playback architecture in conjunction with physically based acoustics and reverb metrics. The block diagram 800b may include an environment sound tuning block 808, a physically based acoustics block 810, and reverb metric block (world reverb metric block 811, local reverb metric block 812, etc.). The flexible reverb playback architecture may physically combine the raycast generated reverb metrics of the reverb metric block with the sound tuning parameters of the environment sound tuning block 808 and physically based acoustics block 810, and overall calculated acoustic parameters for audio playback on the game platform hardware or software. The sound chosen for audio playback may be represented by one or more sound tuning blocks 806a-806b, such as party pop tuning block 806a and confetti tuning block 806b. For example, the overall acoustic parameters indicate, per sound, an extent of volume, filtering and quantity of sound being routed through particular selected discrete reverbs in a reverb possibility space. For example, a best fit specifying a blend of discrete reverbs at varying size and wetness can be determined by the flexible reverb playback architecture to satisfy the overall calculated acoustic parameters.

The environment sound tuning block 808 of the flexible reverb playback architecture may be configured to adjust environment based reverb parameters, such as environmental openness. As an example, the reverb size can vary depending on the environmental openness of the environment sound tuning block 808, such as based on whether the corresponding sound environment is a more open environment such as depicted in FIG. 4E or a more confined environment such as depicted in FIG. 4F. The physically based acoustics block 810 of the flexible reverb playback architecture may be configured to determine sound specific tuning parameters for each sound or discrete reverb of the particular selected discrete reverbs. For example, the sound specific tuning parameters can include volume, distance, distance scale, and/or the like. The determined sound specific tuning parameters of the physically based acoustics block 810 can be routed to one or more appropriate reverb metric blocks. In this way, the determined tuning parameters can control how each of the selected discrete reverbs sound in the world environment via the world reverb metric block 811, in the local environment via the local reverb metric block 912, and/or a direct path (e.g., reverb at close range). The local reverb metric block 912 may include the determined sound source metric and listener metrics in the local environment.

As such, the flexible reverb playback architecture can be particularly advantageous in games rendered by game platforms where user generated content and/or environment can be likely to occur, such as sandbox games and/or multiple player, multiple environment games. In such games, more accurate or better adjusted reverbs may be more effective at conveying the scale, openness, confinement, layout (e.g., objects within), and/or other information about a particular environment that a player is located in relative to the game. The flexible reverb playback architecture, reverb metrics (e.g., automated reverb metrics), and physically based acoustics as implemented by the game platform according to the present disclosure can also more effectively address changes in game environment. For example, the game platform according to the present disclosure may address the deficiencies of using bounding boxes to manually determine reverbs for game spaces within a large outdoor environment of a multiple player multiple environment game. The flexible reverb playback architecture, reverb metrics, and physically based acoustics according to the present disclosure also advantageously may scale to different game platforms having different performance capabilities.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Example Process

Figure 9:
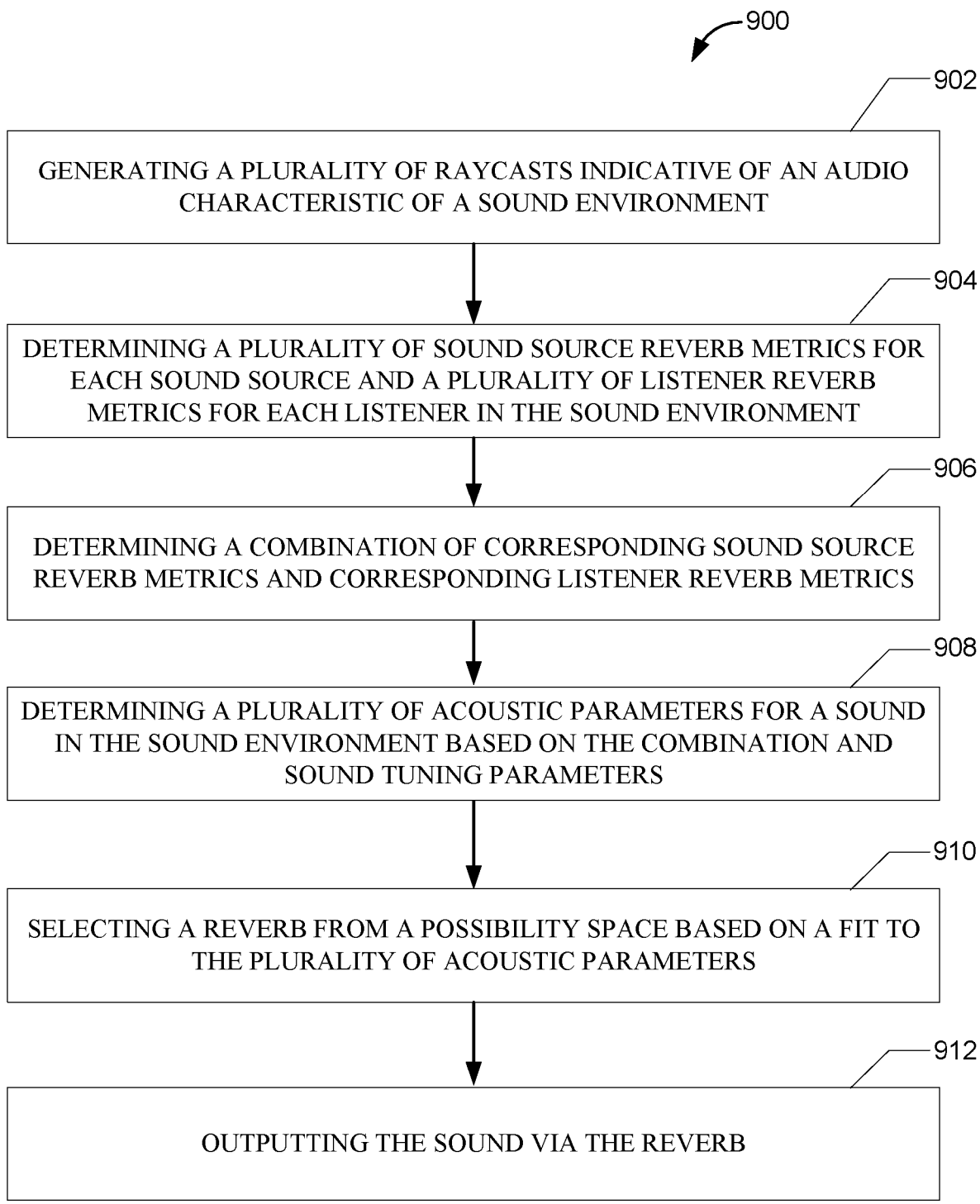
FIG. 9 is an example flow diagram for rendering audio via a game engine, according to certain aspects of the present disclosure.

FIG. 9 illustrates an example flow diagram (e.g., process 900) for rendering audio via a game engine, according to certain aspects of the disclosure. For explanatory purposes, the example process 900 is described herein with reference to one or more of the figures above. Further for explanatory purposes, the blocks of the example process 900 are described herein as occurring in serial, or linearly. However, multiple instances of the example process 900 may occur in parallel, overlapping in time, almost simultaneously, or in a different order from the order illustrated in method 900. In addition, the blocks of the example process 900 need not be performed in the order shown and/or one or more of the blocks of the example process 900 need not be performed. For purposes of explanation of the subject technology, the process 900 will be discussed in reference to one or more figures above. As an example, the process 900 may be performed at least partially by or via the example computing platform 100 in FIG. 1, the example rendering pipeline 200 in FIG. 2, the flexible playback architecture, or the physically based acoustics described above. Accordingly, at least some of the steps in process 900 may be performed by a processor executing commands stored in the example computing platform 100, for example.

At step 902, a plurality of raycasts indicative of an audio characteristic of the sound environment may be generated. For example, the plurality of raycasts may be generated for each sound source and each listener in a sound environment. According to an aspect, generating the plurality of raycasts comprises generating a representation of sound reverberation off a plurality of surfaces in the sound environment. The plurality of surfaces may comprise at least one of: a wall, a floor, a ceiling, a sign, a layer, an outward facing portion of an object, ground, terrain, or a three dimensional model of an object in the sound environment. At step 904, a plurality of sound source reverb metrics for each sound source and a plurality of listener reverb metrics for each listener is determined based on the plurality of raycasts. According to an aspect, determining each listener reverb metric and each sound source reverb metric comprises determining at least one of: a size reverb metric, a wetness reverb metric, an environment type reverb metric, a concrete reverb metric, a wood reverb metric, a length reverb metric, a width reverb metric, a reflectivity reverb metric, and/or the like.

At step 906, a combination of corresponding sound source reverb metrics positioned at the sound source location and corresponding listener reverb metrics positioned at a location of the listener may be determined. For example, the combination may be determined for a sound in the sound environment. According to an aspect, determining the combination of corresponding sound source reverb metrics and the corresponding listener reverb metrics comprises generating playback of the sound that is processed based on the corresponding sound source reverb metrics and the corresponding listener reverb metrics.

At step 908, a plurality of acoustic parameters for the sound may be determined based on sound tuning parameters and the combination of the corresponding sound source reverb metrics and the corresponding listener reverb metrics. According to an aspect, determining the plurality of acoustic parameters comprises determining at least one of: a dry volume acoustic parameter, a bandpass filter width acoustic parameter, a bandpass filter gain acoustic parameter, a reverb volume acoustic parameter, or an early reflection volume acoustic parameter. As an example, the sound tuning parameters can comprise volume tuning parameters or distance scale tuning parameters. According to an aspect, determining the plurality of acoustic parameters comprises determining, based on the plurality of acoustic parameters, a volume change, a filtering characteristic, and an amount of sound routed through the reverb.

At step 910, a reverb from a possibility space associated with the combination of the corresponding sound source reverb metrics and the corresponding listener reverb metrics may be selected. According to an aspect, selecting the reverb from the possibility space comprises selecting a discrete reverb parameter from a range defined by the possibility space to satisfy the plurality of acoustic parameters. For example, the reverb can be selected based on a fit to the plurality of acoustic parameters, such as a best fit. For example, selecting the reverb may comprise selecting a blend of reverbs from the possibility space. At step 912, the sound may be output via the reverb. For example, the sound may be output via the blend of reverbs.

According to an aspect, the process 900 may further include determining the possibility space for a game or a game level rendered via the game engine. For example, the possibility space can correspond to a space rendered for the game. According to an aspect, the process 900 further includes determining a plurality of discrete reverbs in the possibility space based on a performance characteristic corresponding to the game engine. For example, the sound that is output according to the reverb is tuned based on the sound tuning parameters to model sound attenuation. For example, the sound may comprise at least one of: an explosion, footstep, party popper, gun shot, or movement. According to an aspect, the process 900 further includes sending a query to determine the sound environment and the sound sources within the sound environment and receiving an indication of the sound sources within the sound environment.

Example Hardware System

Figure 10:
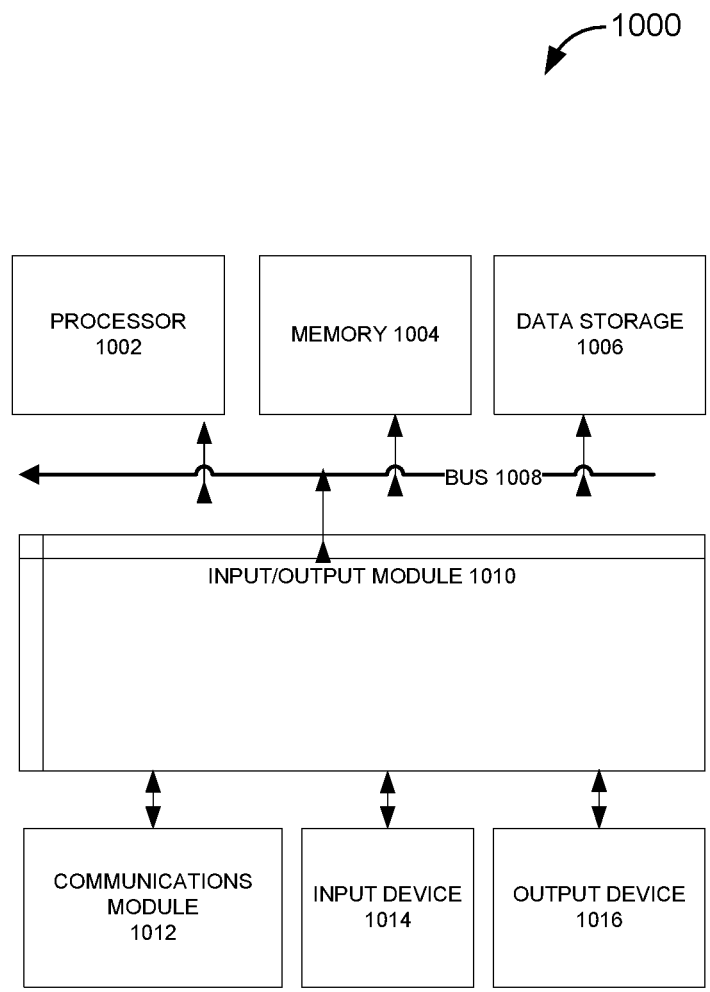
FIG. 10 is a block diagram illustrating an example computer system in which aspects of the present disclosure can be implemented.

FIG. 10 is a block diagram illustrating an exemplary computer system 1000 with which aspects of the present disclosure can be implemented. In certain aspects, the computer system 1000 may be implemented using hardware or a combination of software and hardware, either in a dedicated server, integrated into another entity, or distributed across multiple entities.

Computer system 1000 (e.g., computing device 310) includes a bus 1008 or other communication mechanism for communicating information, and a processor 1002 (e.g., CPU 104, GPU 108) coupled with bus 1008 for processing information. By way of example, the computer system 1000 may be implemented with one or more processors 1002. Processor 1002 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

The computer system 1000 can include, in addition to hardware, code that creates an execution environment for the computer program in question, for example, code that constitutes processor firmware, a protocol stack, a database management system, an operating system, or a combination of one or more of them stored in an included memory 1004 (e.g., memory 440 of FIG. 2), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 1008 for storing information and instructions to be executed by processor 1002. The processor 1002 and the memory 1004 can be supplemented by, or incorporated in, special purpose logic circuitry.

The instructions may be stored in the memory 1004 and implemented in one or more computer program products, i.e., one or more modules of computer program instructions encoded on a computer readable medium for execution by, or to control the operation of, the computer system 1000, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1004 may also be used for storing temporary variable or other intermediate information during execution of instructions to be executed by processor 1002.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1000 further includes a data storage device 1006 such as a magnetic disk or optical disk, coupled to bus 1008 for storing information and instructions. Computer system 1000 may be coupled via input/output module 1010 to various devices. The input/output module 1010 can be any input/output module. Exemplary input/output modules 1010 include data ports such as USB ports. The input/output module 1010 is configured to connect to a communications module 1012. Exemplary communications modules 1012 include networking interface cards, such as Ethernet cards and modems. In certain aspects, the input/output module 1010 is configured to connect to a plurality of devices, such as an input device 1014 and/or an output device 1016. Exemplary input devices 1014 include a keyboard and a pointing device, e.g., a mouse or a trackball, by which a user can provide input to the computer system 1000. Other kinds of input devices 1014 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 1016 include display devices such as a LCD (liquid crystal display) monitor, for displaying information to the user.

According to one aspect of the present disclosure, the computing platform 100 and the architecture 300 can be implemented using a computer system 1000 in response to processor 1002 executing one or more sequences of one or more instructions contained in memory 1004. Such instructions may be read into the memory 1004 from another machine-readable medium, such as data storage device 1006. Execution of the sequences of instructions contained in the main memory 1004 causes processor 1002 to perform the process steps described herein. One or more processors in a multi-processing arrangement may also be employed to execute the sequences of instructions contained in memory 1004. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

The computer system 1000 can include clients and servers. A client and server are generally remote from each other and typically interact through a communication network. The relationship of client and server arises by virtue of computer programs running on the respective computers and having a client-server relationship to each other. The computer system 1000 can be, for example, and without limitation, a desktop computer, laptop computer, or tablet computer. The computer system 1000 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 1002 for execution. Such a medium may take many forms, including, but not limited to, non-volatile media, volatile media, and transmission media. Non-volatile media include, for example, optical or magnetic disks, such as data storage device 1006. Volatile media include dynamic memory, such as memory 1004. Transmission media include coaxial cables, copper wire, and fiber optics, including the wires that comprise bus 1008. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include", "have", or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration". Any embodiment described herein as "exemplary" is not necessarily to be construed as preferred or advantageous over other embodiments.

A reference to an element in the singular is not intended to mean "one and only one" unless specifically stated, but rather "one or more". All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for rendering audio via a game engine, the method comprising:

generating, for each sound source and each listener in a sound environment, a plurality of raycasts indicative of an audio characteristic of the sound environment;

determining, based on the plurality of raycasts, a plurality of sound source reverb metrics for each sound source and a plurality of listener reverb metrics for each listener;

determining, for a sound in the sound environment, a combination of corresponding sound source reverb metrics positioned at a sound source location and corresponding listener reverb metrics positioned at a location of the listener;

determining, based on sound tuning parameters and the combination of the corresponding sound source reverb metrics and the corresponding listener reverb metrics, a plurality of acoustic parameters for the sound;

selecting, based on a fit to the plurality of acoustic parameters, a reverb from a possibility space associated with the combination of the corresponding sound source reverb metrics and the corresponding listener reverb metrics; and outputting the sound via the reverb.

2. The computer-implemented method of claim 1, wherein generating the plurality of raycasts comprises generating a representation of sound reverberation off a plurality of surfaces in the sound environment, wherein the plurality of surfaces comprises at least one of: a wall, a floor, a ceiling, a sign, a layer, an outward facing portion of an object, ground, terrain, or a three dimensional model of an object in the sound environment.

3. The computer-implemented method of claim 1, wherein determining each listener reverb metric and each sound source reverb metric comprises determining at least one of: a size reverb metric, a wetness reverb metric, an environment type reverb metric, a concrete reverb metric, a wood reverb metric, a length reverb metric, a width reverb metric, or a reflectivity reverb metric.

4. The computer-implemented method of claim 1, wherein determining the combination of corresponding sound source reverb metrics and the corresponding listener reverb metrics comprises generating playback of the sound that is processed based on the corresponding sound source reverb metrics and the corresponding listener reverb metrics.

5. The computer-implemented method of claim 1, wherein determining the plurality of acoustic parameters comprises determining at least one of: a dry volume acoustic parameter, a wet volume acoustic parameter, an attenuation acoustic parameter, a filtering acoustic parameter, a bandpass filter width acoustic parameter, a bandpass filter gain acoustic parameter, a reverb volume acoustic parameter, or an early reflection volume acoustic parameter, wherein the sound tuning parameters comprise volume tuning parameters or distance scale tuning parameters.

6. The computer-implemented method of claim 1, wherein determining the plurality of acoustic parameters comprises determining, based on the plurality of acoustic parameters, a volume change, a filtering characteristic, and an amount of sound routed through the reverb.

7. The computer-implemented method of claim 1, wherein selecting the reverb from the possibility space comprises selecting a discrete reverb parameter from a range defined by the possibility space to satisfy the plurality of acoustic parameters.

8. The computer-implemented method of claim 1, further comprising determining the possibility space for a game or a game level rendered via the game engine, wherein the possibility space corresponds to a space rendered for the game.

9. The computer-implemented method of claim 1, further comprising determining a plurality of discrete reverbs in the possibility space based on a performance characteristic corresponding to the game engine, wherein the sound that is output according to the reverb is tuned based on the sound tuning parameters to model sound attenuation.

10. The computer-implemented method of claim 1, further comprising:
sending a query to determine the sound environment and sound sources within the sound environment; and
receiving an indication of the sound sources within the sound environment.

11. A system for rendering audio via a game engine, comprising:
one or more processors; and
a memory comprising instructions stored thereon, which when executed by the one or more processors, causes the one or more processors to perform:
sending a query to determine a sound environment and sound sources within the sound environment;
receiving an indication of the sound sources within the sound environment;
generating, for each sound source and each listener in the sound environment, a plurality of raycasts indicative of an audio characteristic of the sound environment;
determining, based on the plurality of raycasts, a plurality of sound source reverb metrics for each sound source and a plurality of listener reverb metrics for each listener;
determining, for a sound in the sound environment, a combination of corresponding sound source reverb metrics positioned at a sound source location and corresponding listener reverb metrics positioned at a location of the listener;
determining, based on sound tuning parameters and the combination of the corresponding sound source reverb metrics and the corresponding listener reverb metrics, a plurality of acoustic parameters for the sound;
selecting, based on a fit to the plurality of acoustic parameters, a reverb from a possibility space associated with the combination of the corresponding sound source reverb metrics and the corresponding listener reverb metrics; and
outputting the sound via the reverb.

12. The system of claim 11, wherein the instructions that cause the one or more processors to perform generating the plurality of raycasts cause the one or more processors to perform generating a representation of sound reverberation off a plurality of surfaces in the sound environment, wherein the plurality of surfaces comprises at least one of: a wall, a floor, a ceiling, a sign, a layer, outward facing portion of an object, ground, terrain, or a three dimensional model of an object in the sound environment.

13. The system of claim 11, wherein the instructions that cause the one or more processors to perform determining each listener reverb metric and each sound source reverb metric cause the one or more processors to perform:
determining at least one of: a size reverb metric, a wetness reverb metric, an environment type reverb metric, a concrete reverb metric, a wood reverb metric, a length reverb metric, a width reverb metric, or a reflectivity reverb metric; and
generating playback of the sound that is processed based on the corresponding sound source reverb metrics and the corresponding listener reverb metrics.

14. The system of claim 11, wherein the instructions that cause the one or more processors to perform determining the plurality of acoustic parameters cause the one or more processors to perform determining at least one of: a dry volume acoustic parameter, a wet volume acoustic parameter, an attenuation acoustic parameter, a filtering acoustic parameter, a bandpass filter width acoustic parameter, a bandpass filter gain acoustic parameter, a reverb volume acoustic parameter, or an early reflection volume acoustic parameter, wherein the sound tuning parameters comprise volume tuning parameters or distance scale tuning parameters.

15. The system of claim 11, wherein the instructions that cause the one or more processors to perform determining the plurality of acoustic parameters cause the one or more processors to perform determining, based on the plurality of acoustic parameters, a volume change, a filtering characteristic, and an amount of sound routed through the reverb.

16. The system of claim 11, wherein the instructions that cause the one or more processors to perform selecting the reverb from the possibility space comprises selecting a discrete reverb parameter from a range defined by the possibility space to satisfy the plurality of acoustic parameters.

17. The system of claim 11, further comprising stored sequences of instructions, which when executed by the one or more processors, cause the one or more processors to perform determining the possibility space for a game or a game level rendered via the game engine, wherein the possibility space corresponds to a space rendered for the game.

18. The system of claim 11, further comprising stored sequences of instructions, which when executed by the one or more processors, cause the one or more processors to perform determining a plurality of discrete reverbs in the possibility space based on a performance characteristic corresponding to the game engine, wherein the sound that is output according to the reverb is tuned based on the sound tuning parameters to model sound attenuation.

19. The system of claim 11, wherein the sound comprises at least one of: an explosion, footstep, party popper, gun shot, or movement.

20. A non-transitory computer-readable storage medium comprising instructions stored thereon, which when executed by the one or more processors, cause the one or more processors to perform operations for rendering audio via a game engine, comprising:
  generating, for each sound source and each listener in a sound environment, a plurality of raycasts indicative of an audio characteristic of the sound environment;
  determining, based on the plurality of raycasts, a plurality of sound source reverb metrics for each sound source and a plurality of listener reverb metrics for each listener;
  determining, for a sound in the sound environment, a combination of corresponding sound source reverb metrics positioned at a sound source location and corresponding listener reverb metrics positioned at a location of the listener;
  determining, based on sound tuning parameters and the combination of the corresponding sound source reverb metrics and the corresponding listener reverb metrics, a plurality of acoustic parameters for the sound;
  selecting, based on a fit to the plurality of acoustic parameters, a reverb from a possibility space associated with the combination of the corresponding sound source reverb metrics and the corresponding listener reverb metrics; and
  outputting the sound via the reverb.

* * * * *